United States Patent
Howard

(10) Patent No.: US 10,112,707 B1
(45) Date of Patent: Oct. 30, 2018

(54) REMOTELY CONTROLLED CO-AXIAL ROTORCRAFT FOR HEAVY-LIFT AERIAL-CRANE OPERATIONS

(71) Applicant: John V. Howard, Cumming, GA (US)

(72) Inventor: John V. Howard, Cumming, GA (US)

(*) Notice: Subject to any disclaimer, the term of this patent is extended or adjusted under 35 U.S.C. 154(b) by 0 days.

(21) Appl. No.: 15/491,701

(22) Filed: Apr. 19, 2017

Related U.S. Application Data

(60) Continuation-in-part of application No. 15/377,300, filed on Dec. 13, 2016, now Pat. No. 9,751,619, which is a division of application No. 14/872,885, filed on Oct. 1, 2015, now Pat. No. 9,517,838.

(60) Provisional application No. 62/059,440, filed on Oct. 3, 2014.

(51) Int. Cl.
| | |
|---|---|
| B64C 27/00 | (2006.01) |
| B64C 27/08 | (2006.01) |
| B64C 25/32 | (2006.01) |
| B64C 29/02 | (2006.01) |
| B64C 27/12 | (2006.01) |
| B64C 39/02 | (2006.01) |

(52) U.S. Cl.
CPC ............. *B64C 27/08* (2013.01); *B64C 25/32* (2013.01); *B64C 27/12* (2013.01); *B64C 29/02* (2013.01); *B64C 39/024* (2013.01); *B64C 2025/325* (2013.01); *B64C 2201/146* (2013.01)

(58) Field of Classification Search
CPC ......... B64C 27/04; B64C 27/10; B64C 29/02; B64C 29/0025; B64C 2201/024; B64C 2201/128
See application file for complete search history.

(56) References Cited

U.S. PATENT DOCUMENTS

| | | | | |
|---|---|---|---|---|
| 2,712,420 A | * | 7/1955 | Amster | B64C 29/0091 244/100 R |
| 2,622,826 A | * | 12/1955 | Prince | |
| 2,954,185 A | * | 9/1960 | Spratt | B64C 1/00 244/3 |
| 3,116,040 A | | 12/1963 | Petrides | |
| 3,907,219 A | | 9/1975 | Pharris | |
| 4,163,535 A | * | 8/1979 | Austin | B64C 39/024 244/17.11 |
| 4,267,987 A | * | 5/1981 | McDonnell | B64D 39/00 244/137.4 |
| 5,114,096 A | * | 5/1992 | Wernicke | B64C 29/02 244/45 A |

(Continued)

FOREIGN PATENT DOCUMENTS

| | | |
|---|---|---|
| GB | 2312056 A | 10/1997 |
| KR | 1020090090982 A | 8/2009 |

OTHER PUBLICATIONS https://aviation.stackexchange.com/questions/44268/what-is-the-lift-to-empty-weight-ratio-of-some-popular-modern-helicopters (Year: 2017).*

(Continued)

*Primary Examiner* — Richard G Davis
(74) *Attorney, Agent, or Firm* — James E. Walton

(57) ABSTRACT

An unmanned rotorcraft has a lift module having a propulsion system and coaxial rotors driven in rotation by the propulsion system. The rotorcraft includes a payload support system adapted to couple an external payload directly to the lift module. The rotorcraft is devoid of provisions for human passengers.

12 Claims, 36 Drawing Sheets

(56) References Cited

U.S. PATENT DOCUMENTS

| | | | |
|---|---|---|---|
| 5,289,994 A * | 3/1994 | Del Campo Aguilera | B64C 27/22 244/12.1 |
| 5,370,341 A | 12/1994 | Leon | |
| 6,398,157 B1 * | 6/2002 | Ingram | B64C 3/40 244/46 |
| 7,059,566 B2 | 6/2006 | Byers | |
| 7,946,530 B1 * | 5/2011 | Talmage, Jr. | B64C 27/006 244/118.2 |
| 8,915,466 B2 | 12/2014 | Figoureux | |
| 8,991,751 B2 * | 3/2015 | Page | B64C 29/02 244/39 |
| 2002/0008759 A1 | 1/2002 | Hoyos | |
| 2005/0236518 A1 | 10/2005 | Scott | |
| 2006/0060694 A1 | 3/2006 | Nonami | |
| 2007/0012818 A1 | 1/2007 | Miyazawa | |
| 2009/0146010 A1 | 6/2009 | Cohen | |
| 2010/0012769 A1 | 1/2010 | Alber | |
| 2010/0096490 A1 | 4/2010 | Gordon | |
| 2010/0252673 A1 | 10/2010 | Tourn | |
| 2011/0186687 A1 | 8/2011 | Elder | |
| 2012/0199698 A1 * | 8/2012 | Thomasson | B64C 39/024 244/175 |
| 2014/0032034 A1 | 1/2014 | Raptopoulos | |
| 2014/0217230 A1 | 8/2014 | Helou, Jr. | |
| 2015/0028155 A1 * | 1/2015 | Reiter | B64C 27/16 244/39 |
| 2015/0123462 A1 | 5/2015 | Kamradt | |

OTHER PUBLICATIONS

Non-Final Rejection dated Jul. 13, 2016 from corresponding U.S. Appl. No. 14/872,885.
Amendment dated Sep. 1, 2016 from corresponding U.S. Appl. No. 14/872,885.
Final Rejection dated Sep. 19, 2016 from corresponding U.S. Appl. No. 14/872,885.
Amendment After Final dated Oct. 18, 2016 from corresponding U.S. Appl. No. 14/872,885.
Notice of Allowance dated Oct. 10, 2016 from corresponding U.S. Appl. No. 14/872,885.
Notice of Allowance dated Jun. 16, 2017 from corresponding U.S. Appl. No. 15/377,300.

* cited by examiner

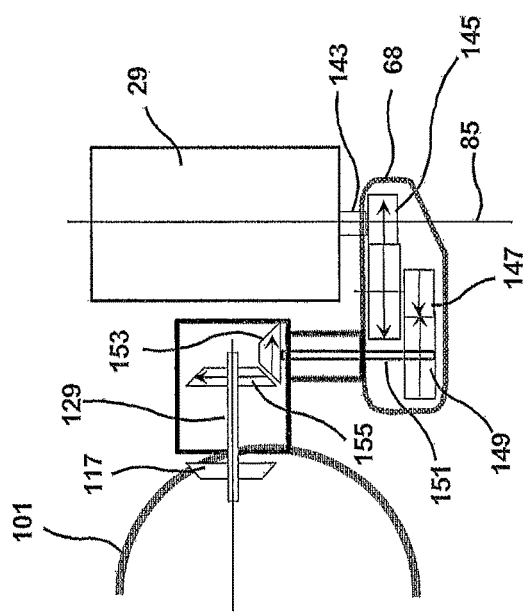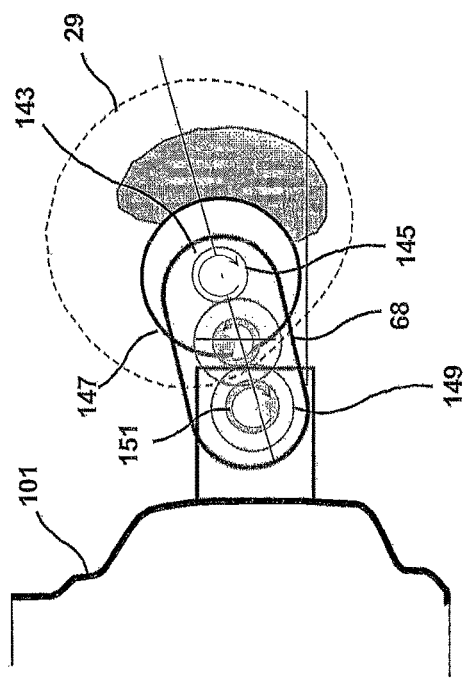

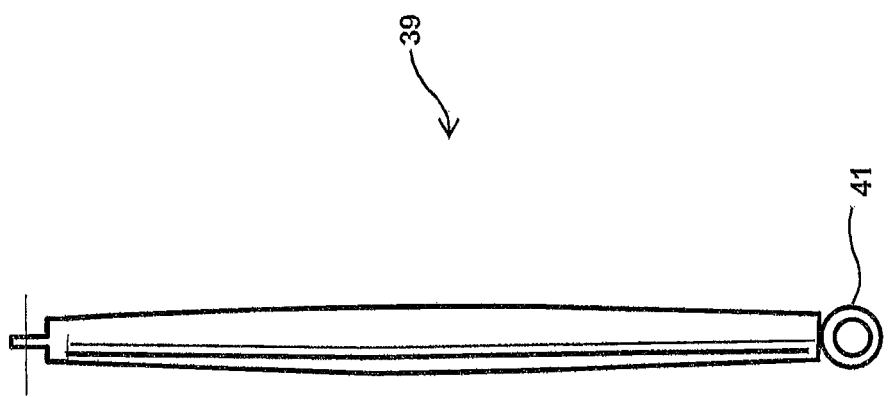

REMOTELY CONTROLLED CO-AXIAL ROTORCRAFT FOR HEAVY-LIFT AERIAL-CRANE OPERATIONS

CROSS-REFERENCE TO RELATED APPLICATIONS AND PRIORITY CLAIM

This application is a continuation-in-part of application Ser. No. 15/377,300, filed Dec. 13, 2016, which is a division of application Ser. No. 14/872,885, filed Oct. 1, 2015, now U.S. Pat. No. 9,517,838, all of which claim the benefit of provisional application 62/059,440, filed Oct. 3, 2014, all of which are incorporated herein by reference for all purposes.

BACKGROUND

Field of the Invention

The present application relates generally to rotorcraft, and more particularly to a remotely controlled co-axial rotorcraft for heavy-lift aerial crane operations and associated systems and methods.

Description of Related Art

Many industries use existing manned helicopter types, which are mostly based on 1960s technology. These aging, manned aircraft are generally ill-suited for crane operations, primarily due to inefficiencies inherent in the need to accommodate the human crew. A significant amount of lift capability is lost in order to provide for crew accommodations and safety, and helicopters designed initially as troop carriers are particularly inefficient in the heavy-lift crane role. In addition, carrying humans in the vehicle requires significant payroll, insurance, and training costs.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 13A and 13B are plan and front, respectively, partial cutaway views of an intermediate gearbox of the rotorcraft of FIG. 1;

FIG. 14 is a side view of a lift bar of the rotorcraft of FIG. 1;

Figure 1:
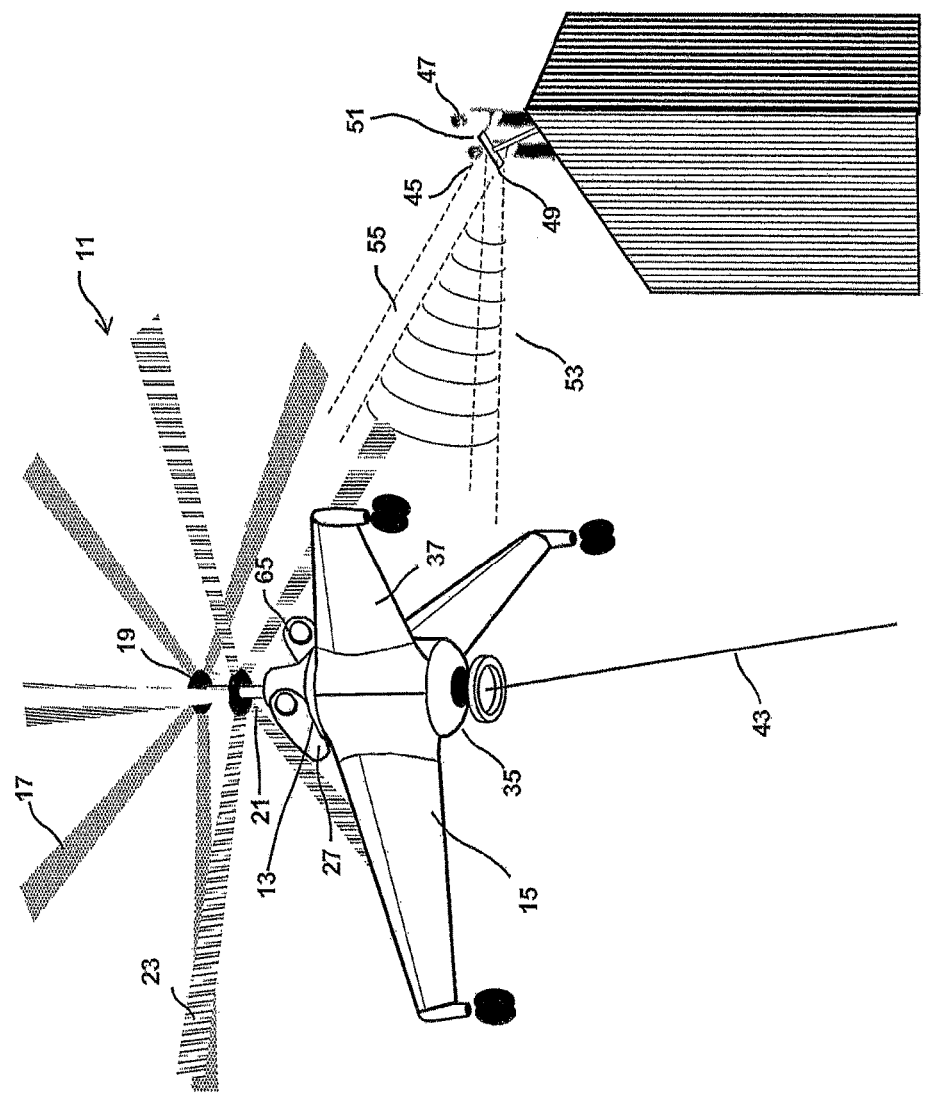
FIG. 1 is a perspective view of a heavy lift rotorcraft according to the present application.

Where used in the various figures of the drawings, the same reference numerals designate the same or similar parts. Furthermore, when the terms "front," "back," "first," "second," "upper," "lower," "height," "top," "bottom," "outer," "inner," "width," "length," "end," "side," "horizontal," "vertical," and similar terms are used herein, it should be understood that these terms have reference only to the structure shown in the drawing and are utilized only to facilitate describing embodiments of the present disclosure.

All figures are drawn for ease of explanation of the basic teachings of the present disclosure only; the extensions of the figures with respect to number, position, relationship, and dimensions of the parts will either be explained or will be within the skill of persons of ordinary skill in the art after the following teachings of the present disclosure have been read and understood. Further, the exact dimensions and dimensional proportions to conform to specific width, length, and similar requirements will likewise be within the skill of the art after the following teachings of the present disclosure have been read and understood.

DETAILED DESCRIPTION OF THE PREFERRED EMBODIMENT

Illustrative embodiments are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Logging, construction, wind generation, firefighting, and many other associated industries have a need for a modern, remotely controlled, co-axial rotorcraft designed specifically as a heavy-lift aerial crane, and an embodiment of such a rotorcraft is shown in FIG. 1. Users of such a vehicle would expect it to be convenient and highly efficient while being inexpensive to maintain and operate.

It is a purpose of this vehicle to capitalize on the lift efficiencies to be gained by removing humans, and the associated support and safety equipment, from the vehicle platform entirely. Removal of the traditional fuselage and required crashworthiness requirements allows the use of novel airframe configurations and construction techniques. Thus, a much higher portion of the total lift can be devoted to the crane function. The rotorcraft can now be much smaller for a given lift, resulting in further synergies. A co-axial design also eliminates the weight of a tail rotor drive components and supporting tail boom or other systems designed to counteract yaw induced by a single rotor. Another synergistic contribution to a low airframe weight is that the entire cargo weight is suspended from a cable attached directly to the transmission. Consequently, landing and ground handling loads on the airframe structure involve only the empty weight plus fuel, versus a fully loaded aircraft.

The novel features of this invention are based on three basic design philosophies. The first is to achieve a vehicle weight reduction to the point that the crane can lift items that weigh close to 72% of the total rotor lift capacity. Thus, in this embodiment the vehicle weight is reduced to 15,000 lb, resulting in a payload capability of 40,000 lb versus a loft capacity of 55,000 lb. The second is to pursue maximum use of identical modules and components in order to reduce production, acquisition and operating costs. It has been shown that the novel features and general architecture of this invention can be applied successfully over a wide range lift capabilities, thereby allowing a range of crane sizes to be offered to suit customer requirements. From this stems the third philosophy, which is to use low-cost flying scale models to pursue development and refinement of new remote control techniques. An additional advantage to the configuration is the ability of some embodiments to be disassembled for transport without the need to fly the rotorcraft to a location. This ability may include the disassembly or folding of the rotors, disassembly of a lift module from a support module, and/or disassembly or folding of the support module.

It is expected that during operation of this vehicle, people will be positioned well clear of the operating site so no loss of life would occur in the event of an accident. Additionally, in the rare occurrence of loss of control, the vehicle's small size and primarily composite airframe and rotor construction would also be an important factor in reducing any collateral damage. It is also anticipated that this vehicle will be operated at low altitudes in confined spaces, with only limited cross-country excursions. Operational hazard to other airborne vehicles is not expected to be a regulatory problem.

Figure 2:
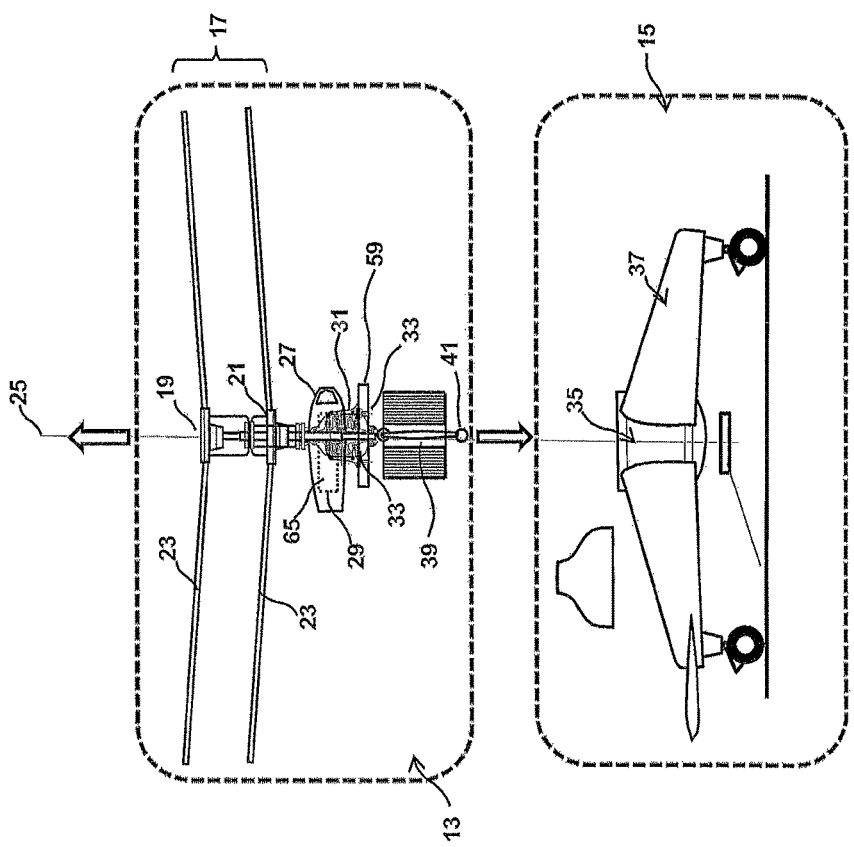
FIG. 2 is an exploded side view of the rotorcraft of FIG. 1.

Referring to FIGS. 1 and 2, a heavy-lift rotorcraft 11 has a unique layout, comprising two distinct and separate modules: a lift module 13 and a support module 15. FIGS. 3 through 22 illustrate details of components of lift module 13, and FIGS. 23 through 31 illustrate details of components of support module 15.

Lift module 13 is dedicated primarily to the payload lift function and combines the propulsion, transmission, rotors, and energy source into a single, self-contained unit. In the preferred embodiment, rotorcraft 11 has a rotor system 17 comprising upper and lower counter-rotating rotors 19, 21, each rotor 19, 21 having a plurality of blades 23. Rotors 19, 21 are driven in rotation about a mast axis 25 by a propulsion system or module 27. In the embodiment shown, propulsion system 27 comprises a pair of turbine engines 29 and a transmission 31, though system 27 may alternatively comprise electric motors or other types of engines. A plurality of yaw actuators 33 are located on lift module 13 for rotating rotorcraft 11 in yaw about mast axis 25, thereby eliminating complex differential-collective yaw mechanisms.

Lift module 13 is preferably mounted above the center of support module 15, which provides inertial stabilization in flight plus a platform for supporting lift module 13 during landings and takeoffs. Support module 15 comprises a centerbody 35 and a plurality of legs 37 extending from centerbody 35 in a radial array.

To reduce the need for heavy structural components in support module 15, a payload support system suspends an external payload directly from lift module 13. In the embodiment shows, a payload lift bar 39 is connected directly to transmission 31, and a payload ring 41 allows an external payload (not shown) to be suspended by a cable 43 attached to ring 41.

Rotorcraft 11 has an onboard flight-control systems (not shown) that may operate in an autonomous mode, or rotorcraft 11 may be operated by one or more external control devices. For example, FIG. 1 shows operators 45, 47 located on a nearby structure using external flight-control devices 49, 51 to emit wireless control signals 53, 55 for operating rotorcraft 11. Signals 53, 55 are received by the onboard flight-control system for controlling both the flight and payload of rotorcraft 11. In the embodiment shown, for example, an operator 45 has primary control of rotorcraft 11 to provide situational awareness, and a second operator 47 has vernier control to make fine adjustments needed to position a payload.

Figure 3:
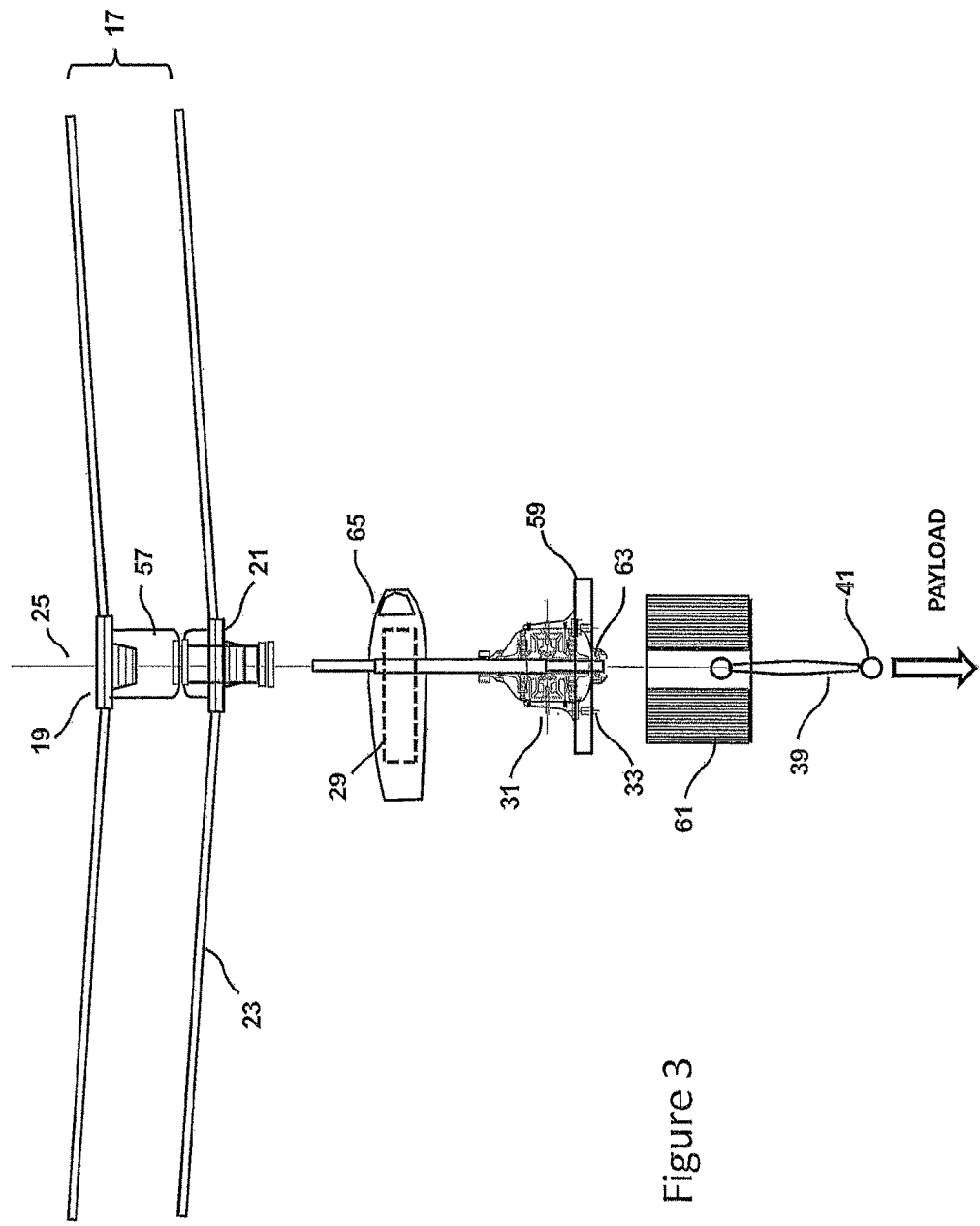
FIG. 3 is an exploded side view of a lift module of the rotorcraft of FIG. 1.
Figure 4:
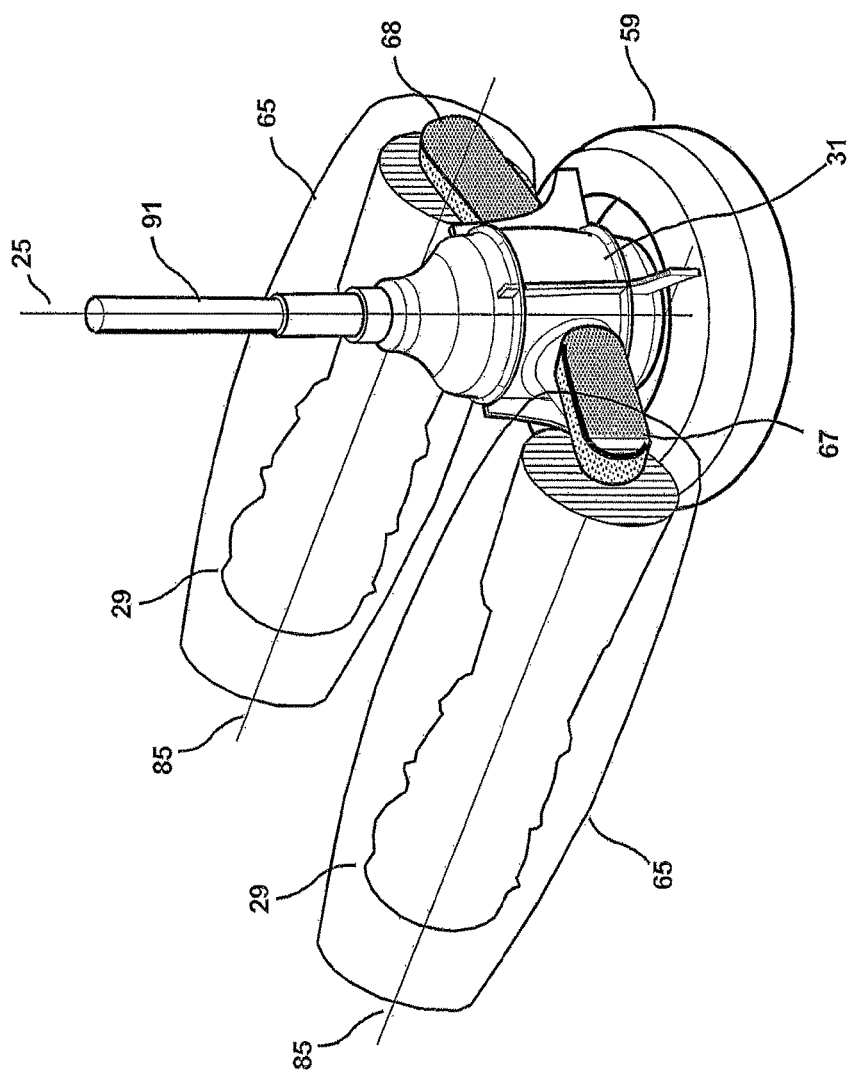
FIG. 4 is a partial cutaway perspective view of a propulsion system of the rotorcraft of FIG. 1.
Figure 5:
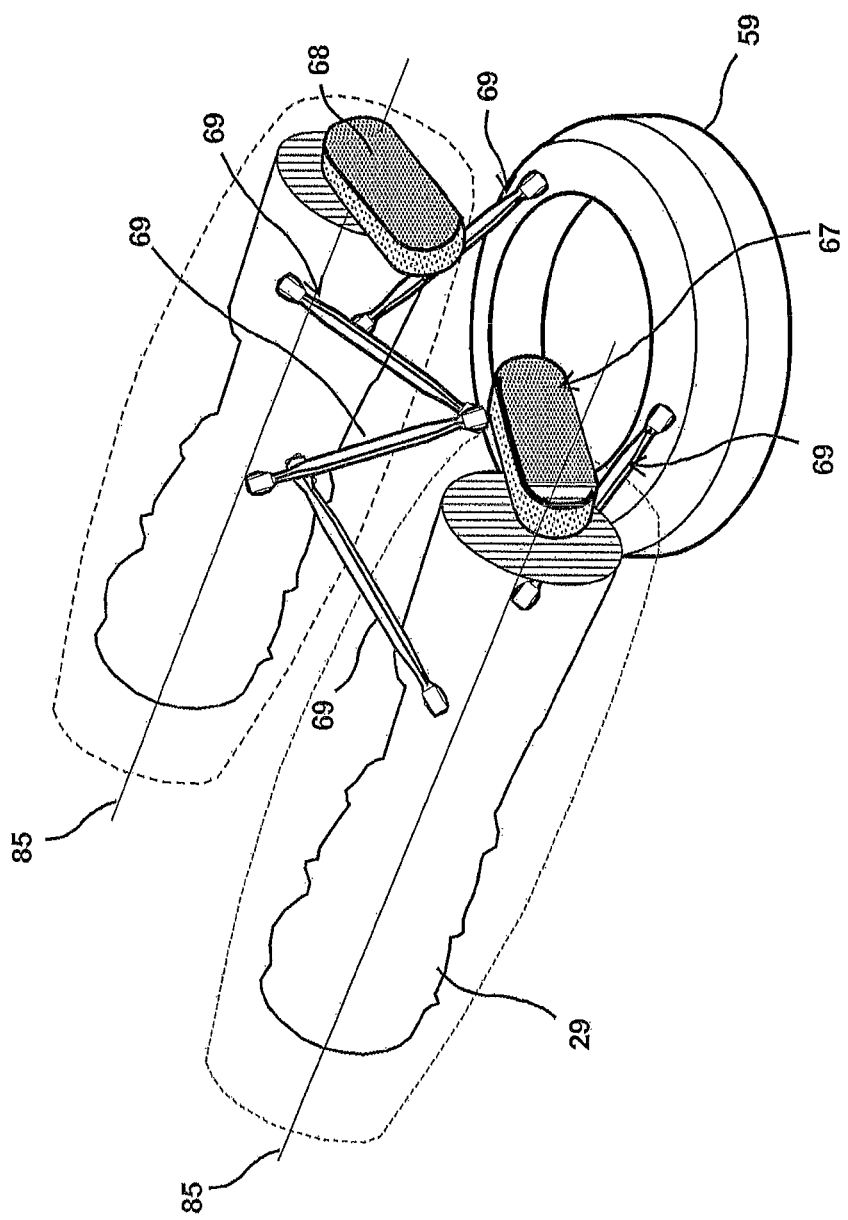
FIG. 5 is a partial cutaway perspective view of the propulsion system of FIG. 4.

Referring now to FIG. 3, lift module 13 is shown in an exploded view. In addition to the components described above, lift module 13 comprises a blade actuation system 57, a rigid support platform 59, and an energy storage device 61. Energy storage device 61 may be a fuel tank or other component, such as a battery or capacitor, for storing energy used to operate propulsion system 27. Transmission 31, yaw actuators 33, and energy storage device 61 are all assembled onto platform 59, which is preferably formed from a composite material, such as a graphite/epoxy composite. The figure also shows the lug 63 on a lower portion of transmission 31 for mounting payload lift bar 39.

Propulsion system 27 is shown in detail in FIGS. 4 through 22. Referring to FIGS. 4 through 8, the illustrated embodiment of system 27 comprises a pair of turbojet engines 29, each enclosed in a nacelle 65. Engines 29 are preferably mounted onto transmission 31 and are also connected to platform 59. Engines 29 are oriented to be generally perpendicular to mast axis 25 and are located on opposite sides of transmission 31. Engines 29 may be, for example, General Electric T64-GE 416 turboshaft engines, each engine 29 rated at 4380 shp at 14300 rpm and having specific fuel consumption of 0.48 lb/hp per hour. While shown with two turbine engines 29, rotorcraft 11 may comprise one or more turbine engines 29, or rotorcraft may be powered by other types of combustion engines, such as reciprocating or rotary. Alternatively, rotorcraft 11 may be powered by electric motors or other types of propulsion devices that produce rotary motion.

Engines 29 are supported at the front by right and left intermediate gearboxes 67, 68 and at various locations by engine mounts 69, which connect engines 29 to support platform 59 and maintain the position of engines 29 relative to each other. Engine mounts 69 may be, for example, metal tubes or may be other appropriate structures, such as composite plates or a combination of types of mounts. See FIG. 36 and associated description below for description of one particular mount for an embodiment according to the present application.

Figure 6:
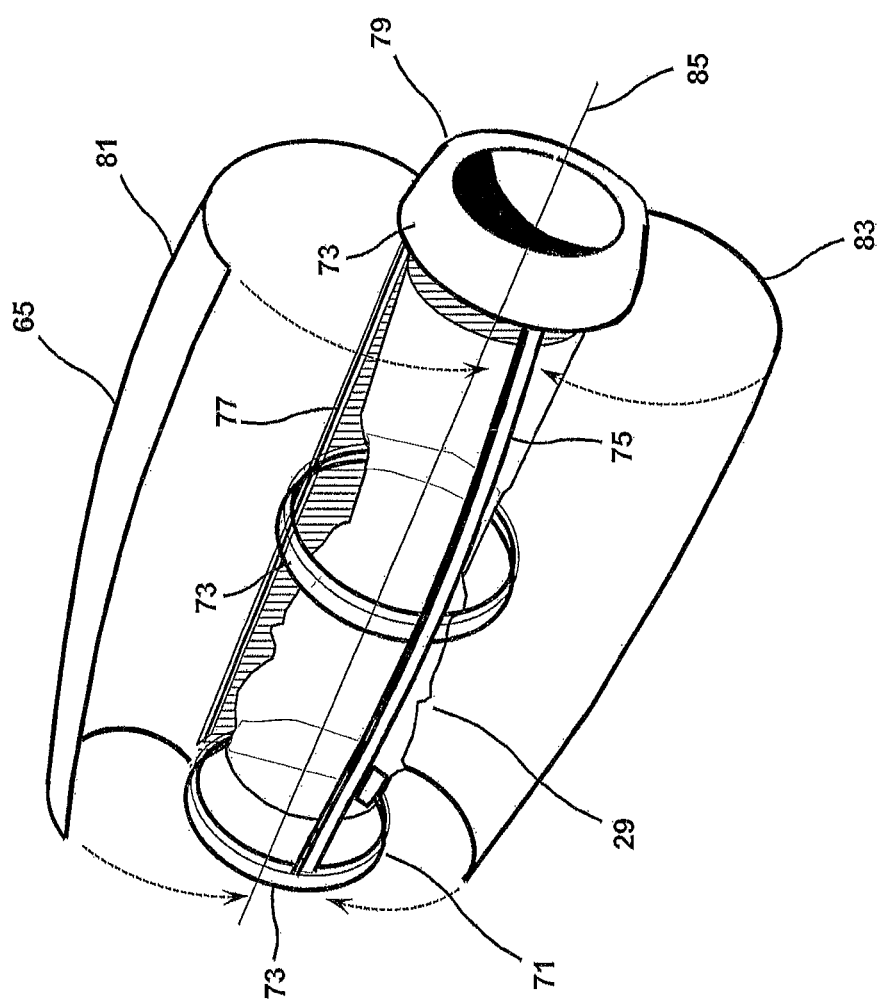
FIG. 6 is a perspective view of a nacelle of the propulsion system of FIG. 4.
Figure 7:
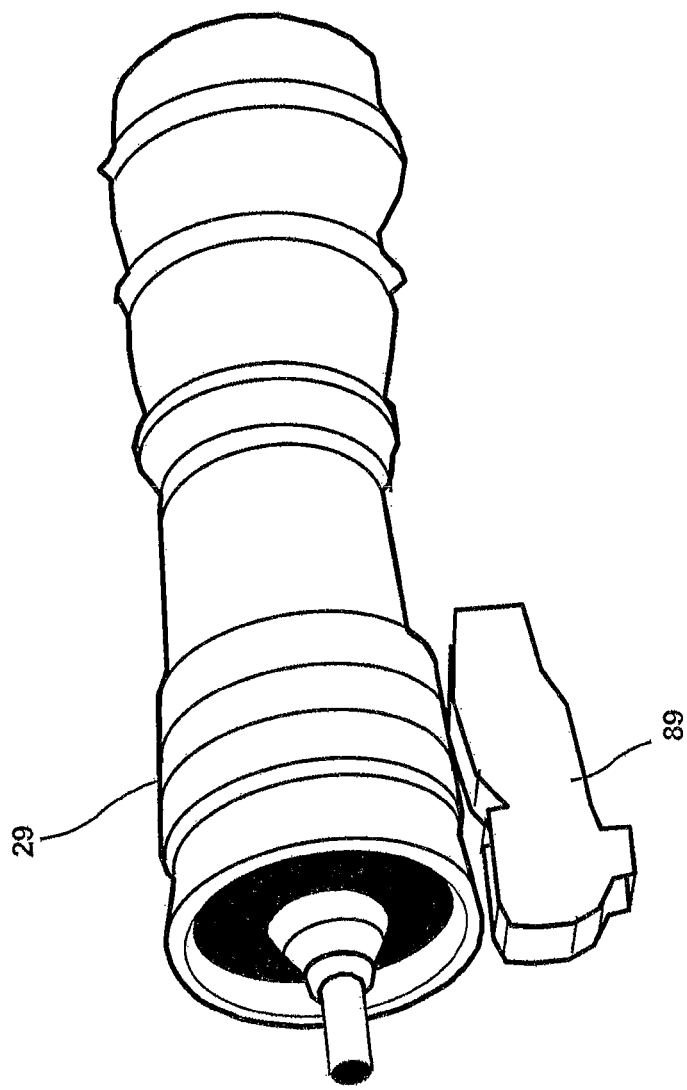
FIG. 7 is an perspective view of an engine of the propulsion system of FIG. 4.

FIG. 6 shows the preferred construction of engine nacelle 65. Nacelle 65 comprises a rigid substructure 71, comprising three ring frames 73, a longeron member 75, and a composite back-plate 77, substructure 71 configured for surrounding and being supported by an engine 29. At the front end of substructure 71, a forward ring frame 73 supports an inlet cowl 79. An upper access door 81, shown in an open position, is hinged along one longitudinal edge to an upper edge of back-plate 77 and configured so that the other longitudinal edge is generally adjacent to longeron 75 when door 81 is moved to a closed position. Similarly, a lower access door 83 is hinged to a lower edge of back-plate 77 so that an opposite edge is adjacent to longeron 75 when door 83 is moved to a closed position. To provide for minimized weight, substructure 71, cowl 79, and doors 81, 83 are preferably formed from lightweight composite materials, such as graphite/epoxy sheets and/or honeycomb. The contours of nacelles 65 may be designed specifically to allow access doors 81, 83 for both nacelles 65 to be manufactured using the same mold, thereby saving manufacturing costs.

Operation of each engine 29 provides for rotary power about each engine axis 85, and the direction of rotation is shown as arrows 87. Each engine 29 is fitted with an accessory gearbox 89 to provide electrical power and hydraulic pressure for use in operation of flight control and auxiliary systems of rotorcraft 11. Power for rotating rotors 19, 21 is taken off the front of each engine 29 by the associated intermediate gearbox 67, 68. Gearboxes 67, 68 preferably comprise as many identical components as is practicable, and each gearbox comprises a gear reduction system, which steps down the engine rpm delivered to transmission 31. For example, gearboxes 67, 68 may reduce the rpm from 14300 rpm to 2868 rpm at an input to transmission 31.

Figure 8:
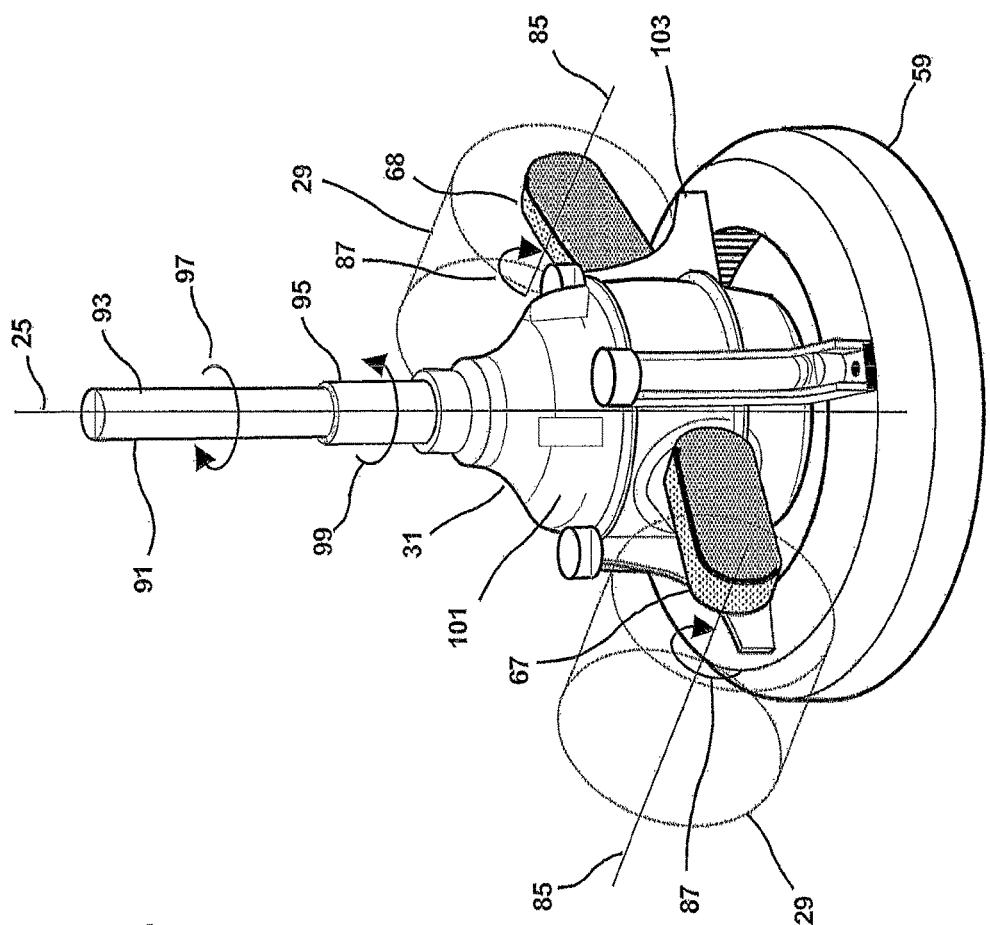
FIG. 8 is an perspective view of a transmission of the propulsion system of FIG. 4.

Referring still to FIG. 8 and also to FIGS. 9 through 13, transmission 31 comprises a gear system for redirecting torque supplied by engines 29 from intermediate gearboxes 67, 68 to coaxial mast assembly 91. Mast assembly 91 comprises upper rotor mast 93 and lower rotor mast 95, masts 93, 95 being rotated in opposite directions about mast axis 25 by transmission 31, as shown by arrows 97, 99. Transmission 31 has a gear case 101 that encloses the gear system, which amplifies engine torque introduced via gearboxes 67, 68. Gear case 101 is preferably formed from aluminum castings and mounted with integral buttress plates 103 onto platform 59, which is used to attach lift module 13 to support module 15.

Figure 9:
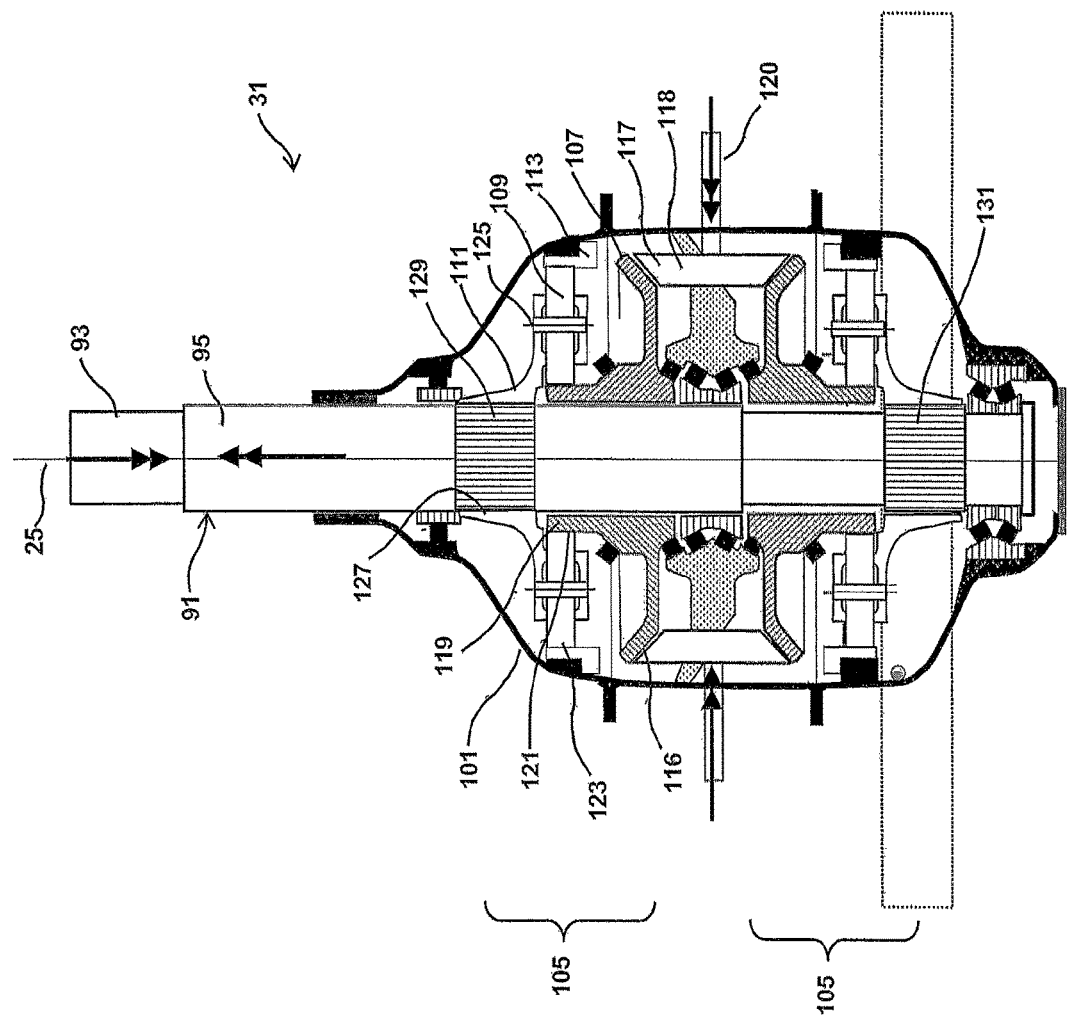
FIG. 9 is a lateral cross-section view of the transmission of FIG. 8.
Figure 10:
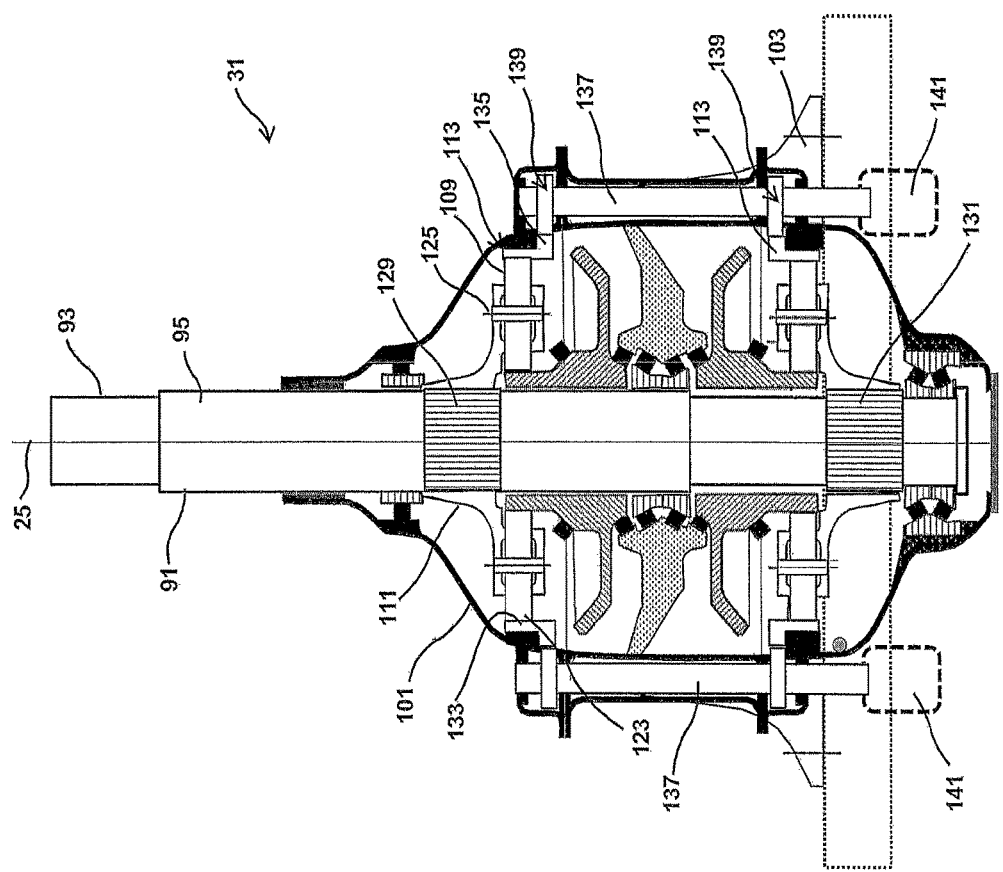
FIG. 10 is a 45-degree cross-section view of the transmission of FIG. 8.
Figure 11:
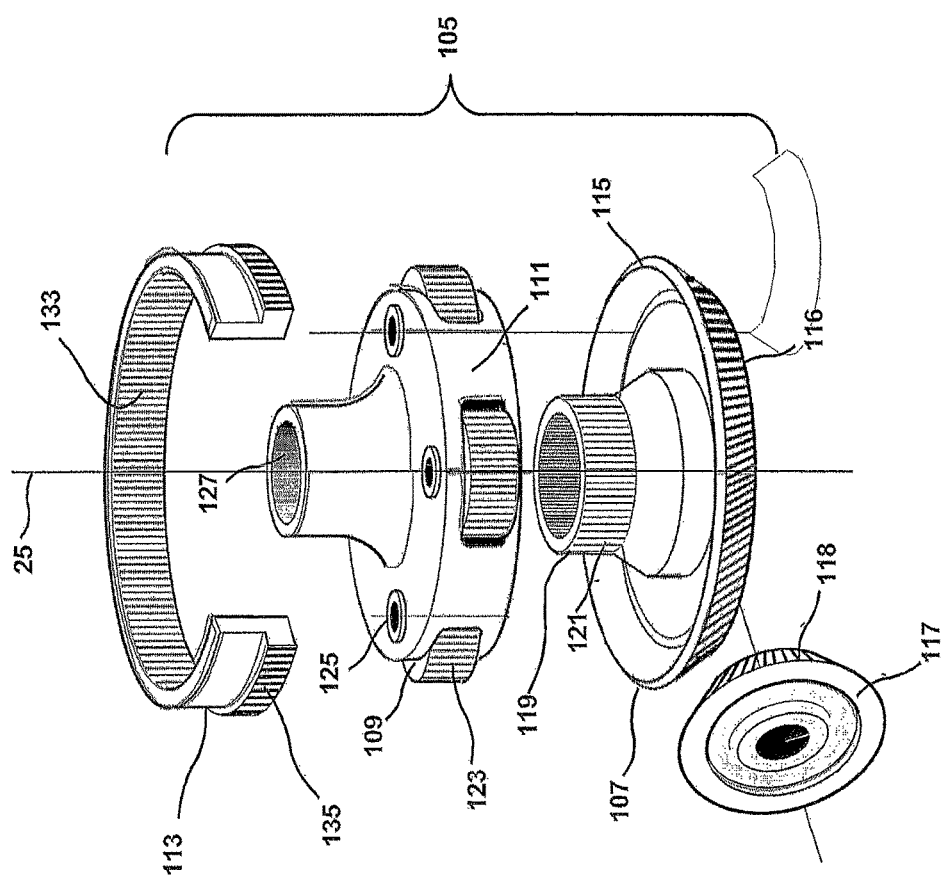
FIG. 11 is an exploded view of a gearset module of the transmission of FIG. 8.
Figure 12:
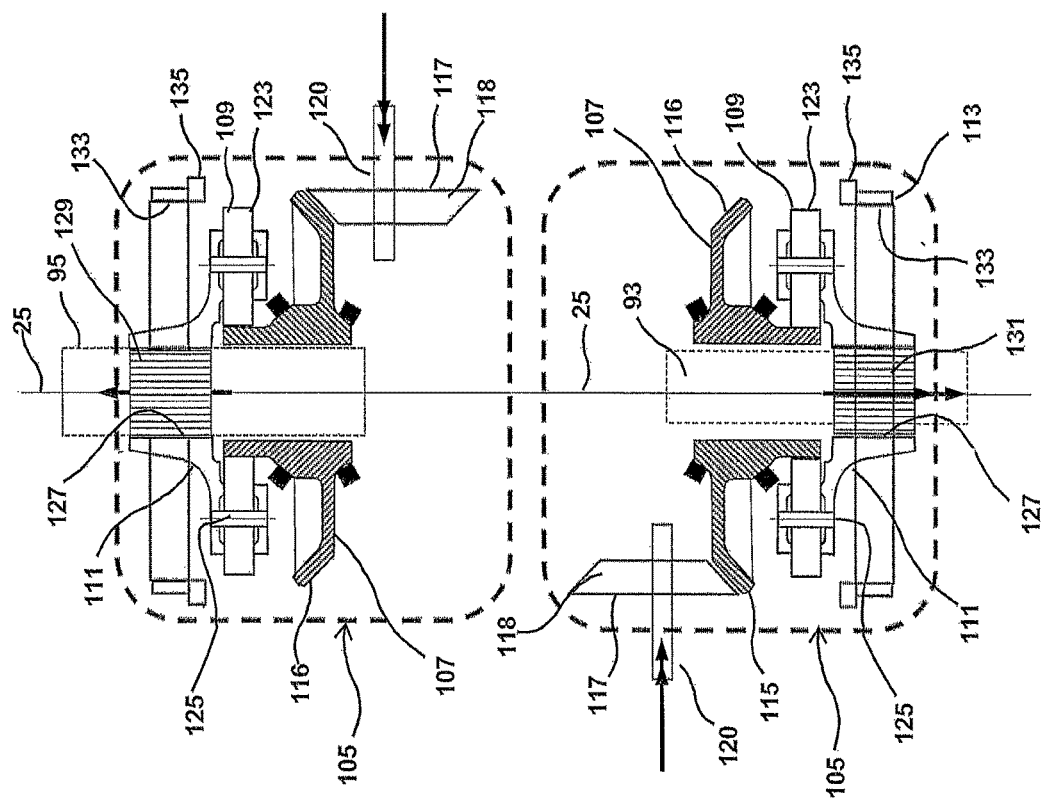
FIG. 12 is an exploded lateral cross-section view of gearset modules of the transmission of FIG. 8.
Figure 15:
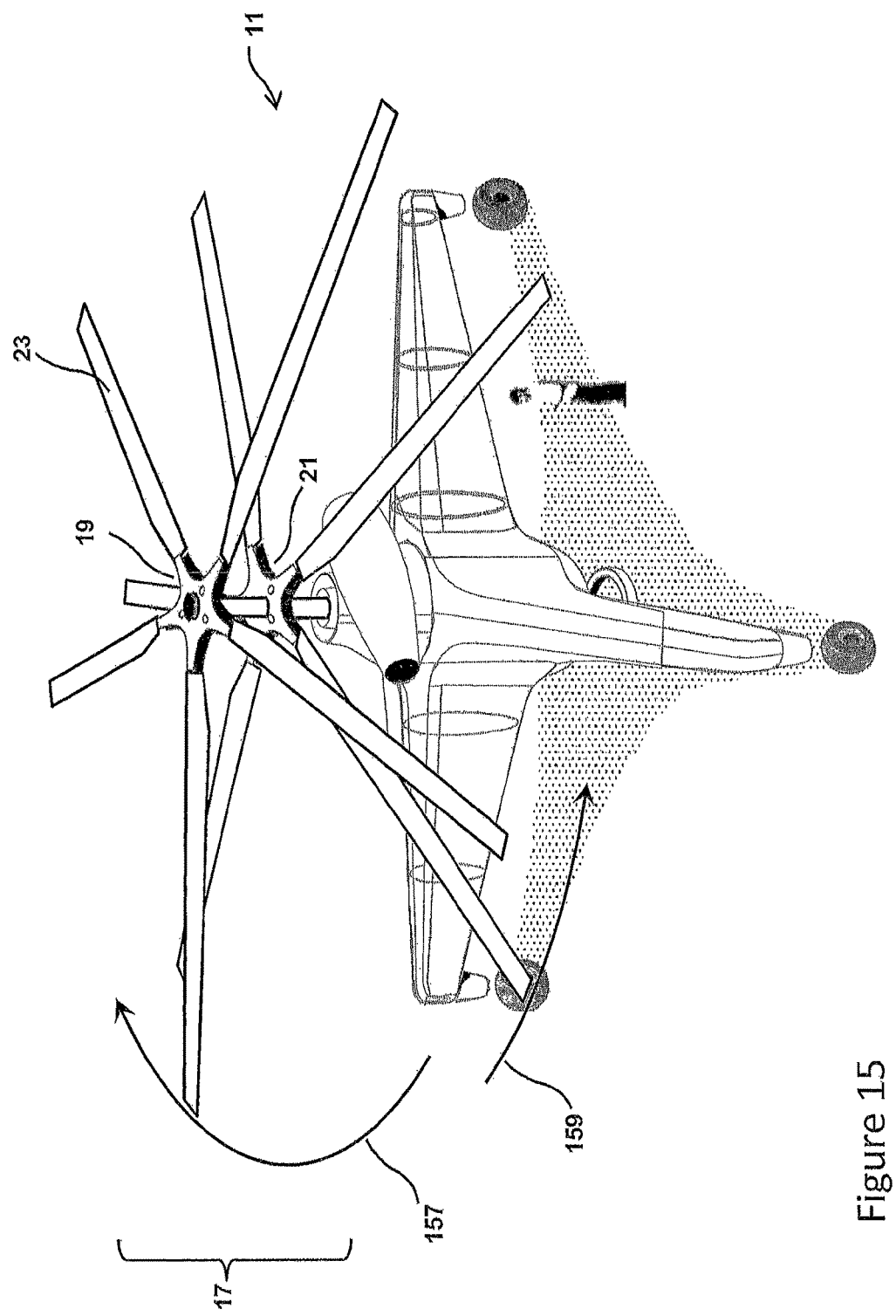
FIG. 15 is a perspective view of a co-axial rotor system of the rotorcraft of FIG. 1.

FIGS. 9 and 10 are lateral and 45-degree, respectively, cross-section views of transmission 31, and FIG. 11 is an isolated view of a gear module 105. Transmission 31 capitalizes on convenient features of the co-axial contra-rotating mast design by maximizing the use of identical gear modules 105, and identical modules 105 can be utilized to save design, manufacturing, inspection, and development test costs. FIG. 12 illustrates how the upper gear module is assembled into the upper portion of case 101 facing upward for driving lower rotor mast 95 in the counter-clockwise direction (as seen from above transmission 31). An identical gear module 105 is assembled facing downward in the lower portion of case 101 for driving upper rotor mast 93 in the clockwise direction (as seen from above transmission 31).

Each gear module 105 is a planetary gearset, comprising a crown gear 107, planetary gears 109 carried in a cage 111, and a ring gear 113. Crown gear 107 comprises an outer bevel gear 115 having gear teeth 116 configured to engage and be driven by a pinion gear 117 having gear teeth 118. Each pinion gear 117 rotates on an axis generally perpendicular to mast axis 25 and is driven by an output shaft 120 of an intermediate gearbox 67, 68. Crown gear also has a central, integral sun gear 119 with teeth 121 for engaging teeth 123 on planetary gears 109, each of which can rotate relative to cage 111 about an associated shaft 125. Central splines 127 of cage 111 engage corresponding splines 129 on mast 95 or splines 131 on mast 93. Ring gear 113 is a circular ring having gear teeth 133 on an inner surface for engaging teeth 123 on planetary gears 109, and ring gear 113 has teeth 135 on an outer surface for use with a yaw control system (described below). Crown gears 107, cages 111, and ring gears 113 are able to rotate about mast axis 25 relative to case 101 of transmission 31.

To rotate rotor masts 93, 95, torque is transferred from gearboxes 67, 68 to each pinion 117 via output shafts 120, pinions 117 rotating in opposite directions. Teeth 118 of each pinion 117 engage with teeth 116 of both crown gears 107, each pinion 117 thereby driving crown gears 107 in opposite directions. Teeth 121 of each sun gear 119 engage teeth 123 of associated planetary gears 109, and teeth 123 also engage teeth 133 of ring gear 113 to cause differential rotation of cages 111 relative to ring gears 113. An additional yaw rotation can be superimposed equally on both cages 111 by a pair of vertical balance shafts 137 which are rotatably carried in case 101 and have upper and lower pinions 139 that engage outer teeth 135 of upper and lower ring gears 113. Vertical balance shafts 137 and pinions 139 balance out differential torque between upper and lower ring gears 113 so that yaw motion can be applied equally to each ring gear with no motion of the ring gears relative to each other. Though shown in the figures with four shafts 137, transmission 31 may have more or fewer shafts 137 to accommodate the expected loads during operation. Assembled modules 105 act as a differential gear set which converts engine torque at input pinions 117 into output torque at co-axial rotor masts 93, 95. In addition to the torque balancing function, shafts 137 provide for yaw control of rotorcraft 11, and a rotary actuator 141 is connected to each balance shaft 137 for rotating the shaft 137 along its longitudinal axis relative to case 101. The yaw control is described below in relation to FIG. 22.

FIGS. 13A and 13B are plan and front, respectively, partial cutaway views, showing details of left intermediate gearbox 68. In another effort to reduce cost, intermediate gearboxes 67, 68 are mostly identical, though gear sets within gearboxes 67, 68 may have different parts to achieve the correct direction of rotation of the associated pinion 117. As shown, an output shaft 143 of engine 29 turns an input gear 145, which turns one side of intermediate gear 147. The other, smaller side of intermediate gear 147 turns another intermediate gear 149, further reducing the engine rpm and increasing torque, and a shaft 151 connects gear 149 and bevel gear 153. Bevel gear 153 turns a larger, perpendicular bevel gear 155 for further reducing engine rpm, increasing torque, and redirecting the torque to output shaft 120. As described above, output shaft 120 is connected to pinion 117 for rotating crown gears 107. As an example of the change in engine rpm and torques achieved by gearboxes 67, 68 and gear modules 105, depending on the selected gear ratios, an input torque of 8000 ft-lb at 3000 rpm may be magnified to a rotor torque of 80,000 ft-lb at 300 rpm.

FIG. 14 illustrates lift bar 39, which is preferably formed from a composite material, such as a graphite/epoxy composite. Depending on the size of rotorcraft 11, lift bar may be of substantial length, and the embodiment shown, for example, has a length of approximately 80 inches. As described above, lift bar 39 is attached at the upper end to lug 63 on the lower portion of case 101 of transmission 31. Lift bar 39 extends through the center of support module 15 and has a payload ring 41 on the lower end of bar 39. The advantage of this configuration is that the forces of an external payload suspended from lift bar 39 are passed directly to case 101, and support module 15 can be constructed without the need to support the external payload.

FIGS. 15 through 21B illustrate the overall configuration of co-axial rotor system 17. Rotors 19, 21 preferably have five blades each, though more or fewer blades may be used in appropriate applications. As viewed from above rotors 19, 21, upper rotor 19 rotates in the clockwise direction, indicated by arrow 157, and lower rotor 21 rotates in the counter-clockwise direction, indicated by arrow 159.

Figures 16A, 16B:
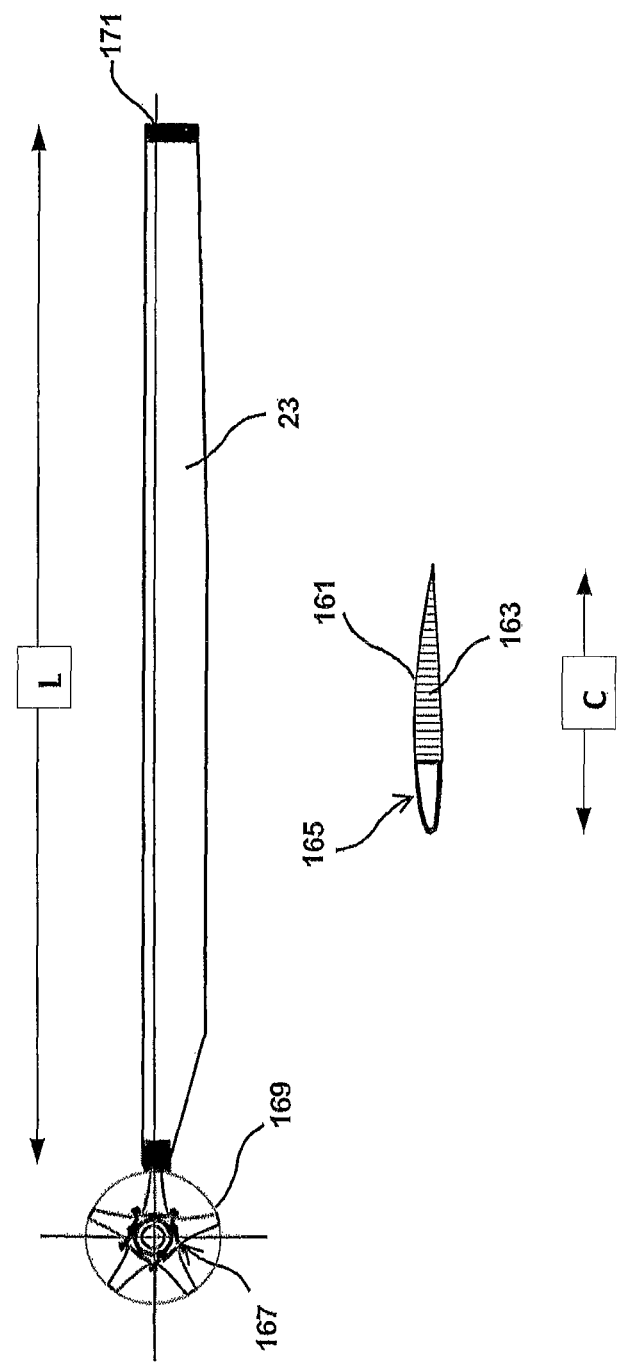
FIGS. 16A and 16B are plan and cross-section views, respectively, of a rotor blade of the rotor system of FIG. 15.

FIGS. 16A and 16B show plan and cross-section views of an example blade 23, which, in the embodiment shown, has a length L of 27.5 ft and a chord C of 20 in. Blade 23 preferably comprises a graphite/epoxy composite skin 161 covering an aft blade section machined from graphite honeycomb 163, and blade 23 has a hollow graphite/epoxy composite spar section 165. Blades are connected to a mast 93, 95 by a hub 167, which comprises five arms 169. Each blade is rotatably connected to an arm 169 so that blade is rotatable about a pitch axis 171.

Figure 17:
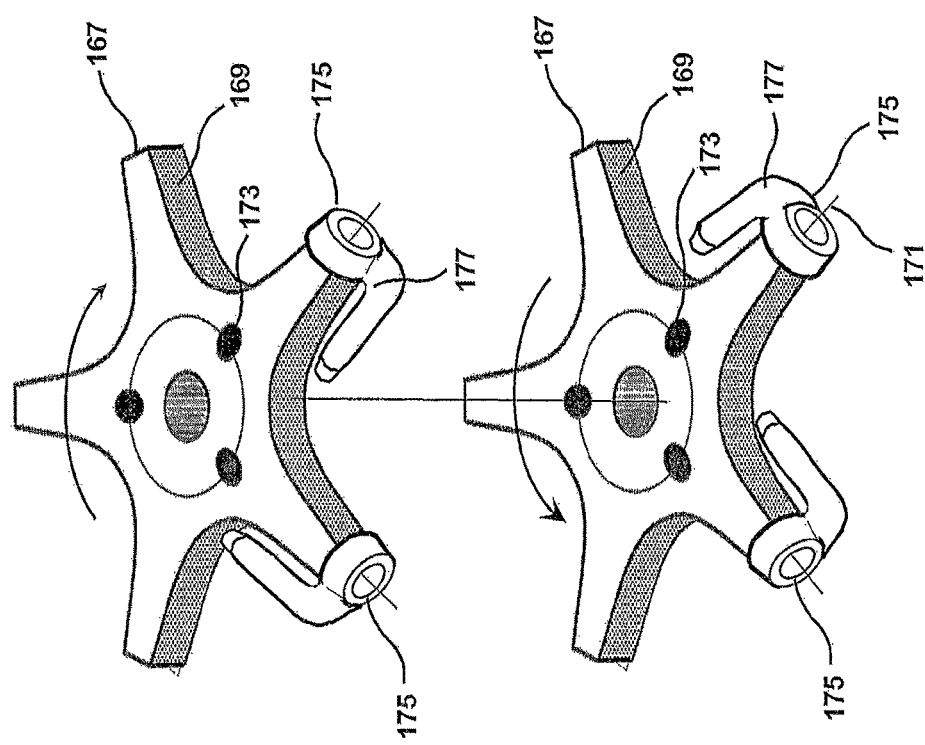
FIG. 17 is a perspective view of rotor hubs of the rotor system of FIG. 15.

FIG. 17 shows upper and lower rotor hubs 167. Upper hub 167 rotates in the clockwise direction and is splined to the smaller, upper mast 93. Lower hub 167 is splined to the larger, lower mast 95 and rotates in the counter-clockwise direction. Both hubs 167 are preferably machined from identical titanium billets in order to reduce material and machining costs. Three holes 173 are provided each hub 167, and they are used in lower hub 167 to allow three actuation rods to pass through lower hub 167.

Figure 18:
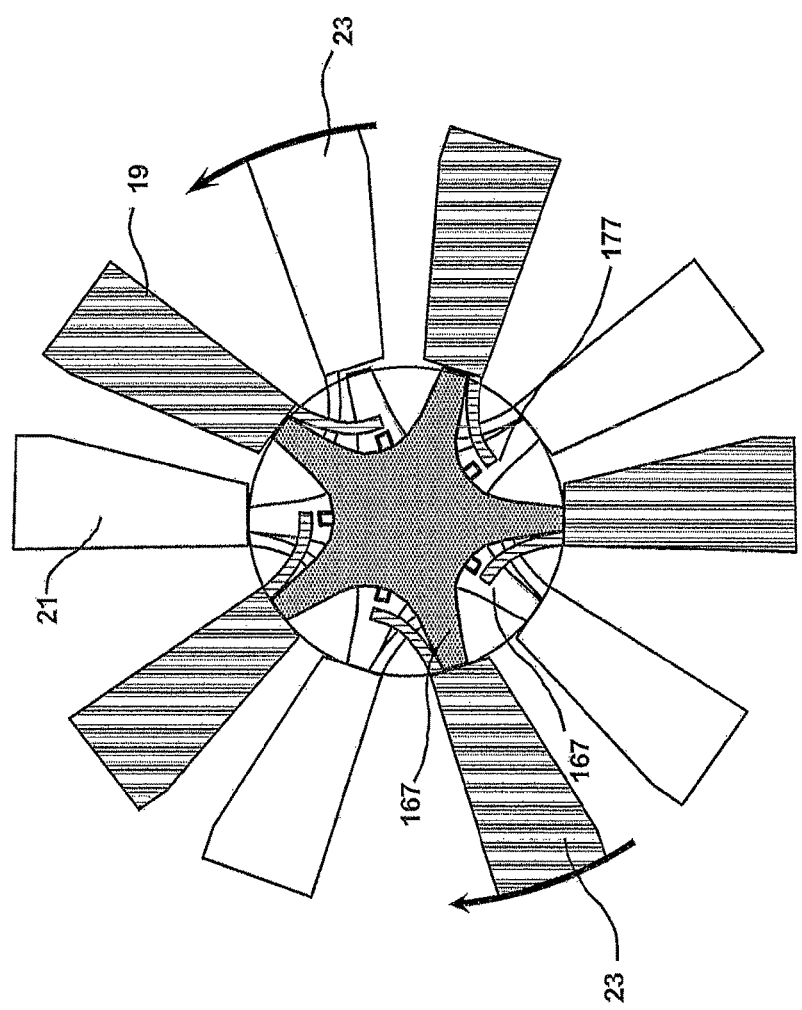
FIG. 18 is a partial top view of rotors of the rotor system of FIG. 15.

Pitch angle, or angle of attack, about pitch axis of each blade 23 is controlled with a blade control arm cuffs 175, a cuff 175 being rotatably connected to an outer end of each arm 169 of hubs 167 and able to be rotated about pitch axis 171. Each cuff 175 has a control arm 177 extending from the central portion of cuff 175 and offset from pitch axis 171. FIG. 18 shows a plan view of rotors 19, 21, and the view shows the azimuth positions of control arms 177 relative to blades 23 of each rotor 19, 21.

Referring now specifically to FIGS. 19 through 21B, cyclic and collective inputs to the co-axial rotor are controlled by a multi-level blade-actuation system, which translates motions from three electro-hydraulic linear actuators 179 mounted on case 101 of transmission 31 into discrete pitch changes of each blade 23 on rotors 19, 21. The pitch changes may be in the form of cyclic pitch changes, which tilts a swashplate to variably change the pitch of each blade 23 as rotor 19, 21 rotates, or collective pitch changes, which vertically translates a swashplate to change the pitch of each blade 23 by a set amount throughout the rotation of rotor 19, 21.

Actuators 179 impart cyclic and collective motions onto the actuator swashplate 181, comprising non-rotating section 183 and rotating section 185. Actuators 179 are pivotally connected to non-rotating section 183 at mounts 187, allowing for relative motion between swashplate assembly 181 and actuators 179 as shaft 189 of each actuator extends or retracts from actuator body 191. Rotating section 185 is able to rotate relative to non-rotating section 183 and is constrained to this one degree of freedom relative to non-rotating section 183, causing input from actuators 179 to non-rotating section 183 are transferred to rotating section 185. Cyclic and collective inputs from actuators 179 cause swashplate 181 to tilt about spherical bearing 193 (shown in FIG. 20B) that is located in the center of swashplate 181. Bearing 193 is connected via splines 195 to the upper portion of case 101 of transmission 31 in order to constrain motion in the azimuth, but splines 195 accommodate vertical collective motion of swashplate 181 via vertical translation along splines 195. Non-rotating section 183 is constrained in azimuth relative to case 101 by a scissors link 196, which allows freedom of motion about spherical bearing 193 in axes perpendicular to mast axis 25. Likewise, rotating section 185 is constrained to rotate together with lower rotor 21 by a similar scissors link 197 connected to mast 95.

Three actuator rods 198 are pivotally connected at a lower end to mounts 199 on rotating section 185 and extend upward through holes 173 in lower hub 167. Actuator rods 198 are pivotally connected at an upper end to a central portion of blade-control swashplate 201 located between rotors 19, 21, and rods 198 transfer the cyclic and collective motions of swashplate 181 to swashplate 201. Swashplate 201 comprises a lower rotating section 203 and an upper rotating section 205, and sections 203, 205 are able to rotate relative to each other. Sections 203, 205 and constrained to this one degree of freedom relative to each other, causing cyclic and collective input from actuator rods 198 to section 203 to be transferred to section 205. Because rotors 19, 21 rotate in opposite directions, sections 203, 205 also rotate in opposite directions, as shown by arrows 207, 209. Cyclic and collective inputs from actuator rods 198 cause swashplate 201 to tilt about spherical bearing 211 (shown in FIG. 21B) that is located in the center of swashplate 201. Bearing 211 is connected via splines 213 to the upper portion of mast 95 in order to rotate bearing 211 with lower section 203, and splines 213 accommodate vertical collective motion of swashplate 201 via vertical translation along splines 213. Lower section 203 rotates together with mast 95 and is connected to mast 95 by a scissors link 215, which allows freedom of motion about spherical bearing 211 on axes perpendicular to mast axis 25. Likewise, upper section 205 is constrained to rotate together with lower rotor 21 with a similar scissors link 217 connected to mast 93.

Figure 19:
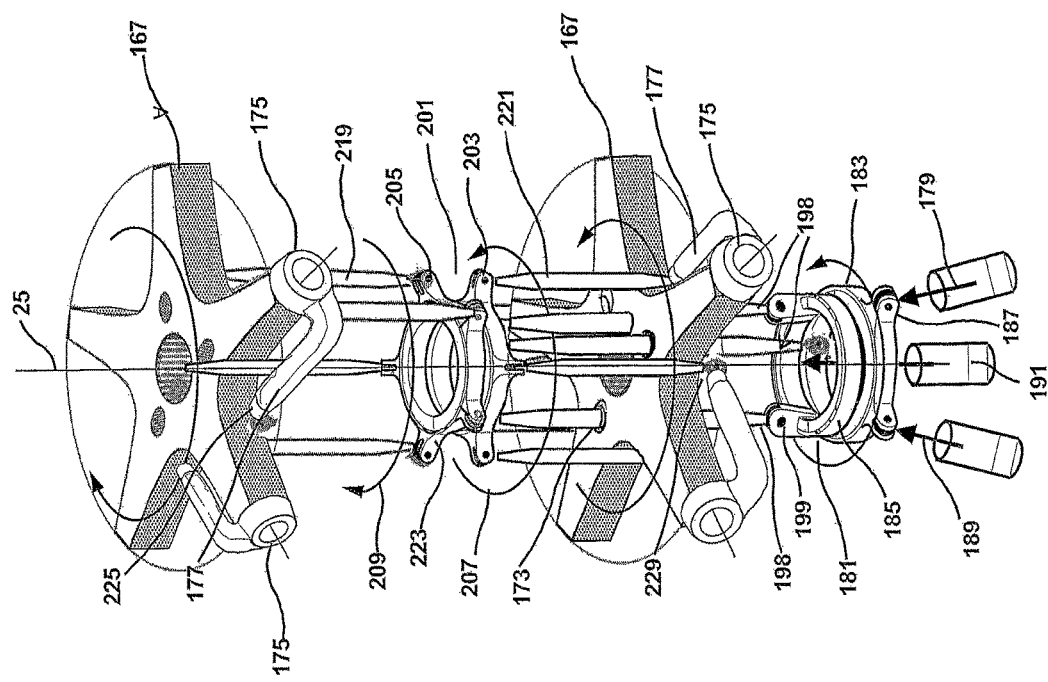
FIG. 19 is a perspective view a portion of the rotor system of FIG. 15.
Figures 20A, 20B:
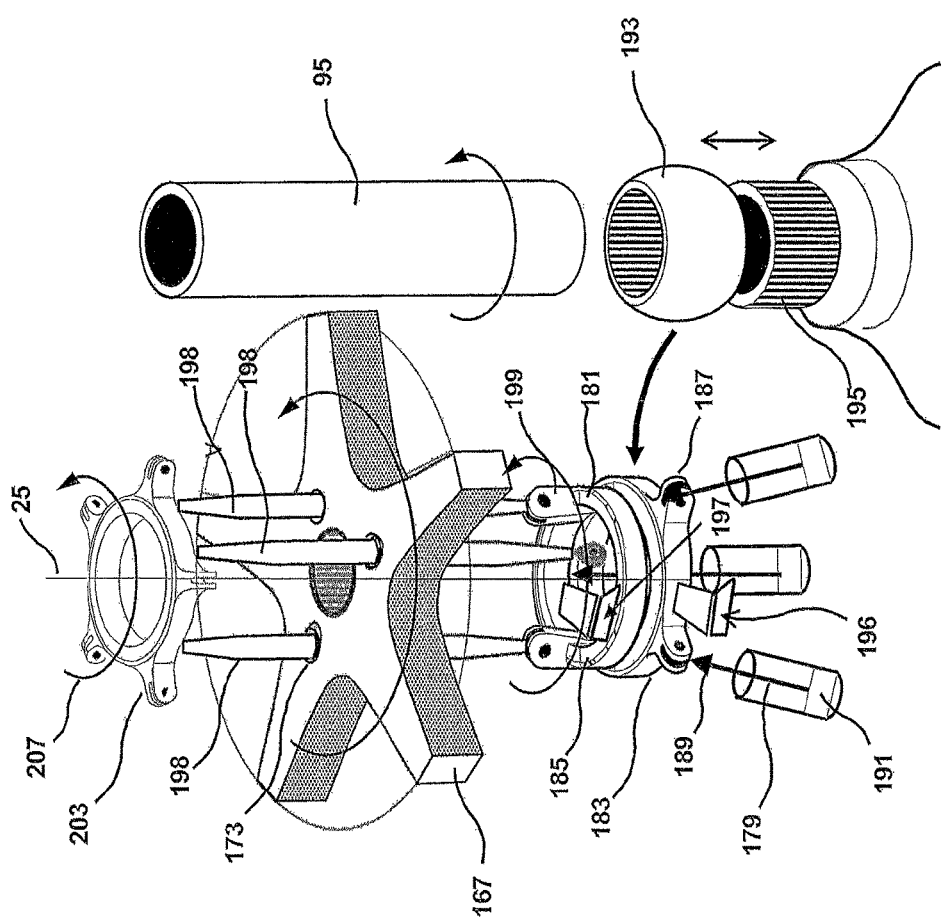
FIGS. 20A and 20B are perspective views of portions of the rotor system of FIG. 15.
Figures 21A, 21B:
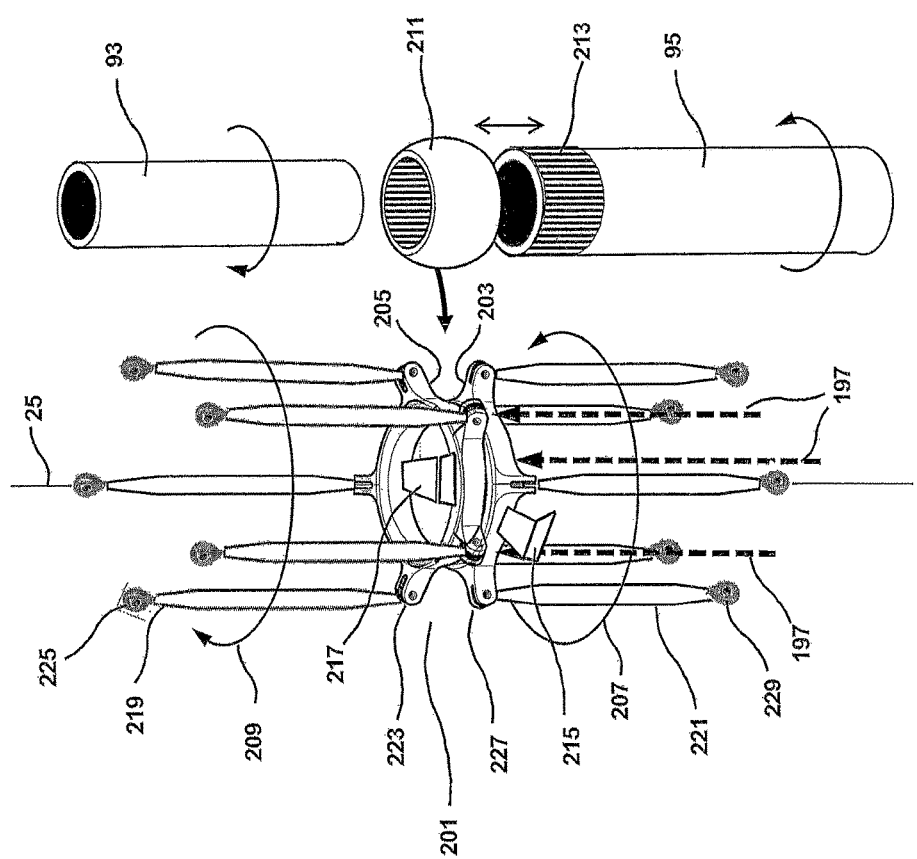
FIGS. 21A and 21B are perspective views of portions of the rotor system of FIG. 15.

Referring specifically to FIGS. 19 and 21A, cyclic and collective motions of blade-control swashplate 201 are transferred to control arms 177 of blade cuffs 175 on upper rotor 19 by five control rods 219 and to control arms 177 of blade cuffs 175 on lower rotor 21 by five control rods 221, one control rod 219 or 221 for each blade 23. Each control rod 219 is pivotally connected at a lower end to a mount 223 on upper section 205 and at an upper end 225 to an associated control arm 177 on upper rotor 19. Likewise, each control rod 221 is pivotally connected at an upper end to a mount 227 on lower section 203 and at a lower end 229 to an associated control arm 177 on lower rotor 21. Blades 23 on upper rotor 19 are controlled by upper section 205 acting on control arms 219, which extend upward, and blades 23 on lower rotor 21 are controlled by lower section 203 acting on control arms 221, which extend downward. This configuration allows for cyclic (tilting) and collective (vertical translation) inputs to be transferred from actuators 179 to actuator swashplate 181, then through actuator rods 198 to swashplate 201, then through control rods 219 from upper section 205 to blade cuffs 175 on upper rotor 19 and through control rods 221 from lower section 203 to blade cuffs 175 on lower rotor 21.

Figure 22:
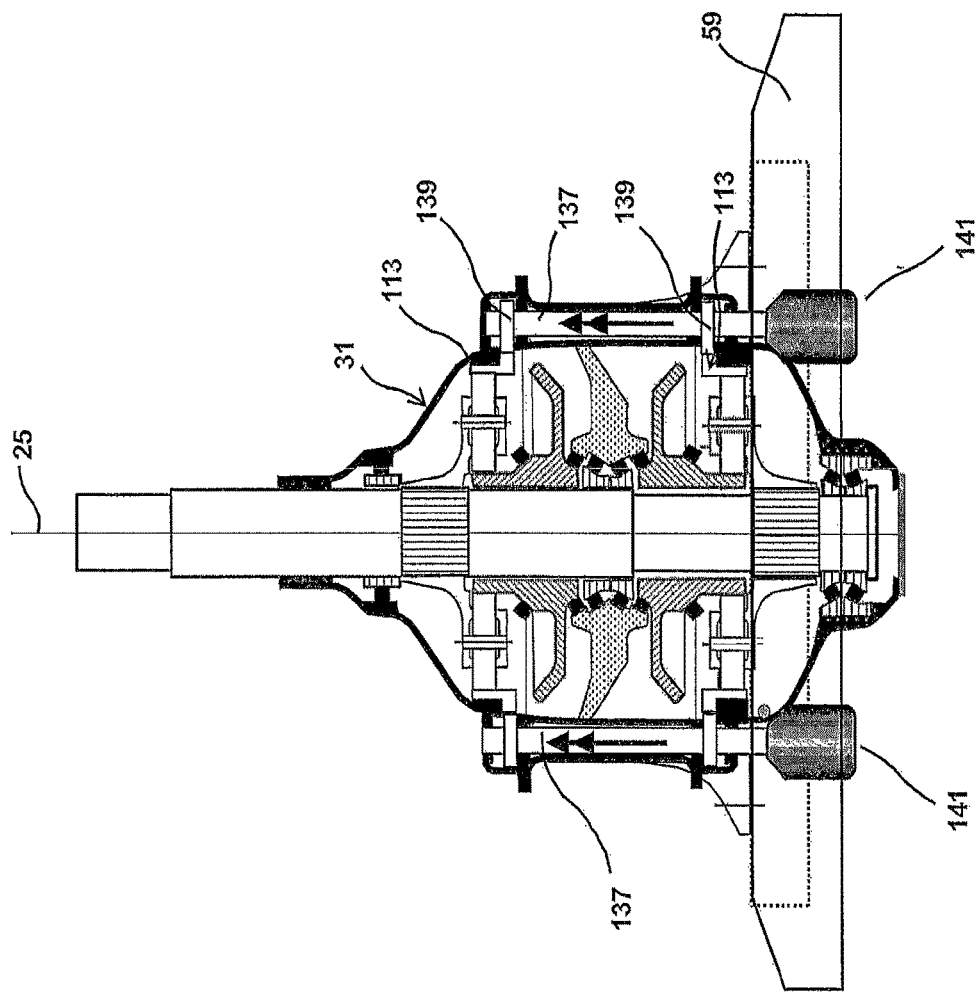
FIG. 22 is a 45-degree cross-section view of a yaw control system of the rotorcraft of FIG. 1.

FIG. 22 illustrates a novel yaw trim and control system for a co-axial rotorcraft. In the prior art, many aircraft having co-axial, contra-rotating rotor systems are controlled in yaw by additional complex swashplate assemblies, which apply collective pitch differentially to the two rotors or utilize braking systems on either rotor. These systems are usually heavy, complicated, and expensive.

The present system utilizes relatively small and lightweight rotary actuators 141 to rotate rotorcraft 11 with respect to both differential ring gears 113 housed within transmission 31. Actuators 141 may be of any appropriate type, such as electric, pneumatic, or hydraulic and preferably feature reversible drive with a clutch to disengage a non-functioning actuator 141. Actuators 141 rotate balance shafts 137 in transmission 31, causing pinions 139 to rotate transmission case 101 around upper and lower ring gears 113. High opposing torques from ring gears 113, which are normally reacted within housing 101, are instead reacted by pinions 139. The opposing torque in pinions 139 is balanced within each shaft 137, so that only relatively low torques are required to turn the housing 101 relative to ring gears 113. Because transmission 31 is mounted with buttress plates 103 to platform 59, as is support module 15, rotation of shafts 137 cause rotorcraft 11 to yaw about mast axis 25.

Figure 23:
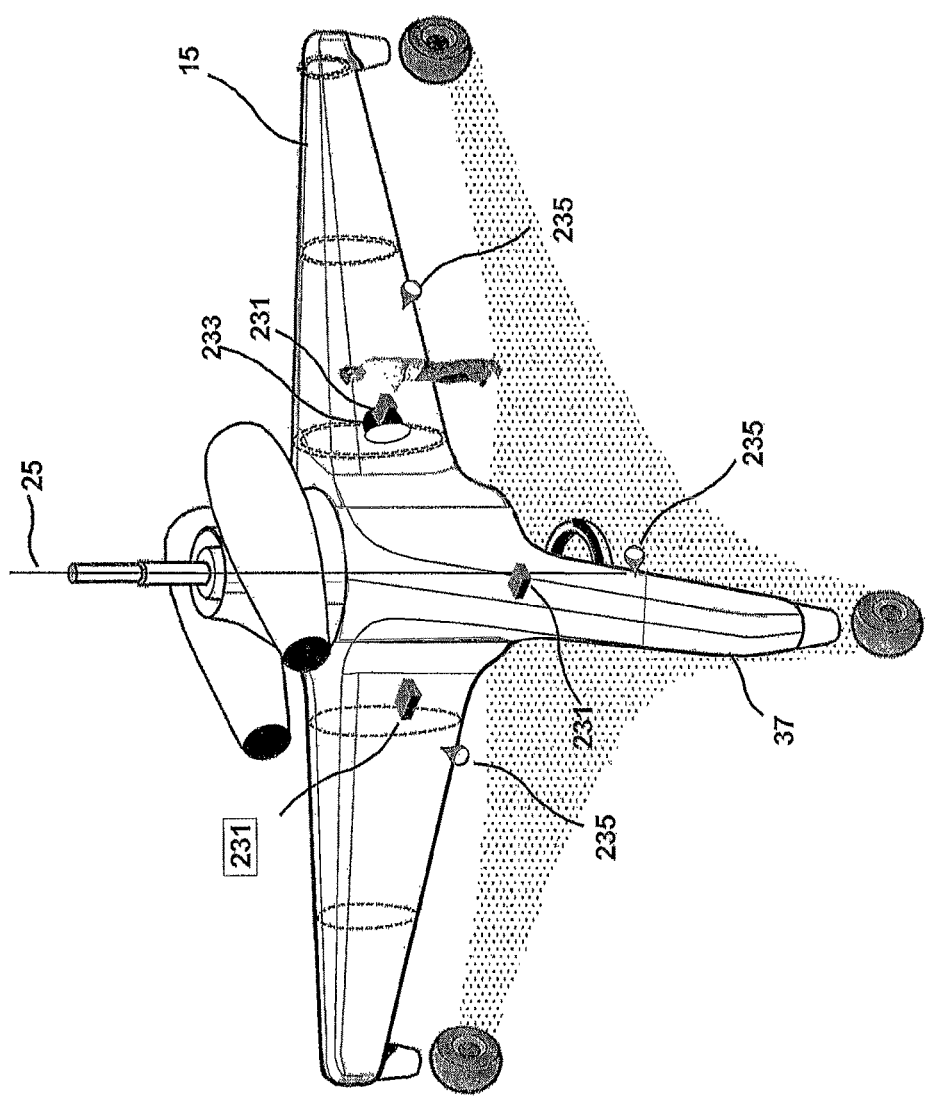
FIG. 23 is a perspective view of a portion of the rotorcraft of FIG. 1.

FIG. 23 illustrates components of an onboard flight-control system. Cyclic, collective, and yaw control actuators are all controlled remotely via radio-control links with the rotorcraft 11, as shown in FIG. 1 and described above. In the preferred embodiment, receivers, transmitters and electronic control functions will be housed in three electronic control modules 231, each module 231 being mounted in one of the airframe legs 37. Convenient doors 233 are provided in the legs to gain ready access to these modules 231. Control modules 231 provide triplex redundancy with advanced loss-of-signal or signal-dropout logic circuits. In addition, numerous remote video cameras 235 are positioned on support module 15 to provide real-time positional information to the operators.

Figure 24:
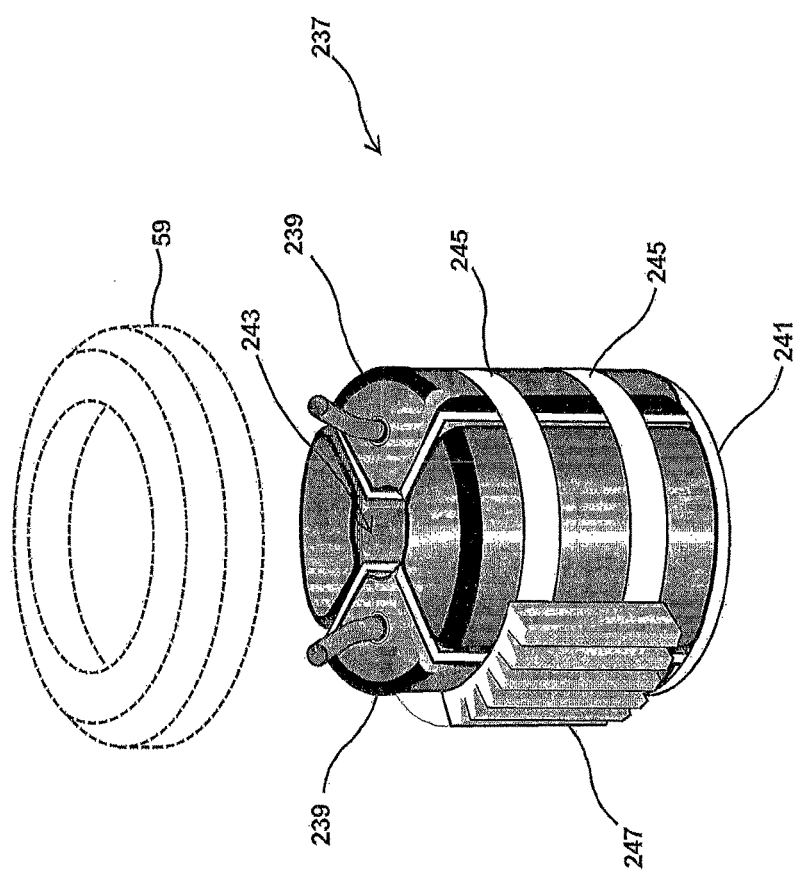
FIG. 24 is a perspective view of a fuel tank of the rotorcraft of FIG. 1.
Figure 25:
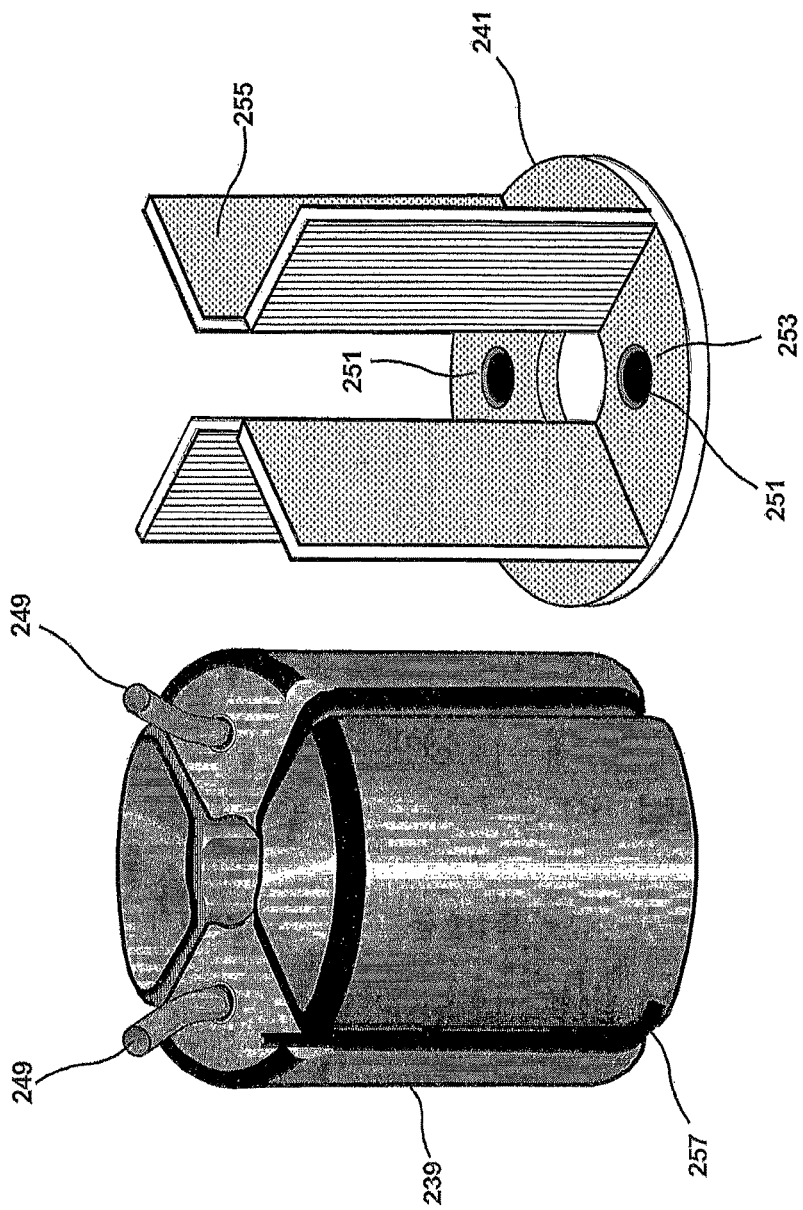
FIG. 25 is an exploded view of the fuel tank of FIG. 24.

FIGS. 24 and 25 illustrate fuel tank system 237, which is supported from rigid composite platform 59 so that it is positioned within centerbody 35 (see FIGS. 1 and 2) of support module 15. System 237 comprises multiple crashworthy tanks 239 in a circular array and carried by a Kevlar basket 241, which extends downward from, and is suspended from, platform 59 and transfers loads from tanks 239 to platform 59. Tanks 239 are shaped to form an aperture 243 in the center of the assembly, allowing lift bar 39 to pass through the center of the array of fuel tanks 239. Tanks 239 are preferably molded from graphite/epoxy composite, and may have a thickness varying from 0.12 in at the top to 0.28 in at the bottom. Each tank preferably has a 300 gal (US) capacity. Tanks 239 are preferably retained within basket 241 by thin Kevlar bands 245, which encircle tanks 239 and are designed to react bursting loads from the hydrostatic pressure of fuel within tanks 239. In addition, tanks 239 are also supported by lightweight foam blocks 247 to keep the tanks tightly fitted within centerbody 35.

Referring specifically to FIG. 25, two filler hoses 249 at the top of tanks 239 facilitate rapid refueling, and tanks 239 may be configured as a single fuel system, a group of separate tanks 239, or as main and auxiliary tanks 239. A sump pump 251 at the base of each tank 239 is mounted in a lower tray 253 of support basket 241, and tray 253 also supports dividers 255 between tanks 239. Vent lines 257 can be conveniently nested within fuel tank system 237.

Figure 26:
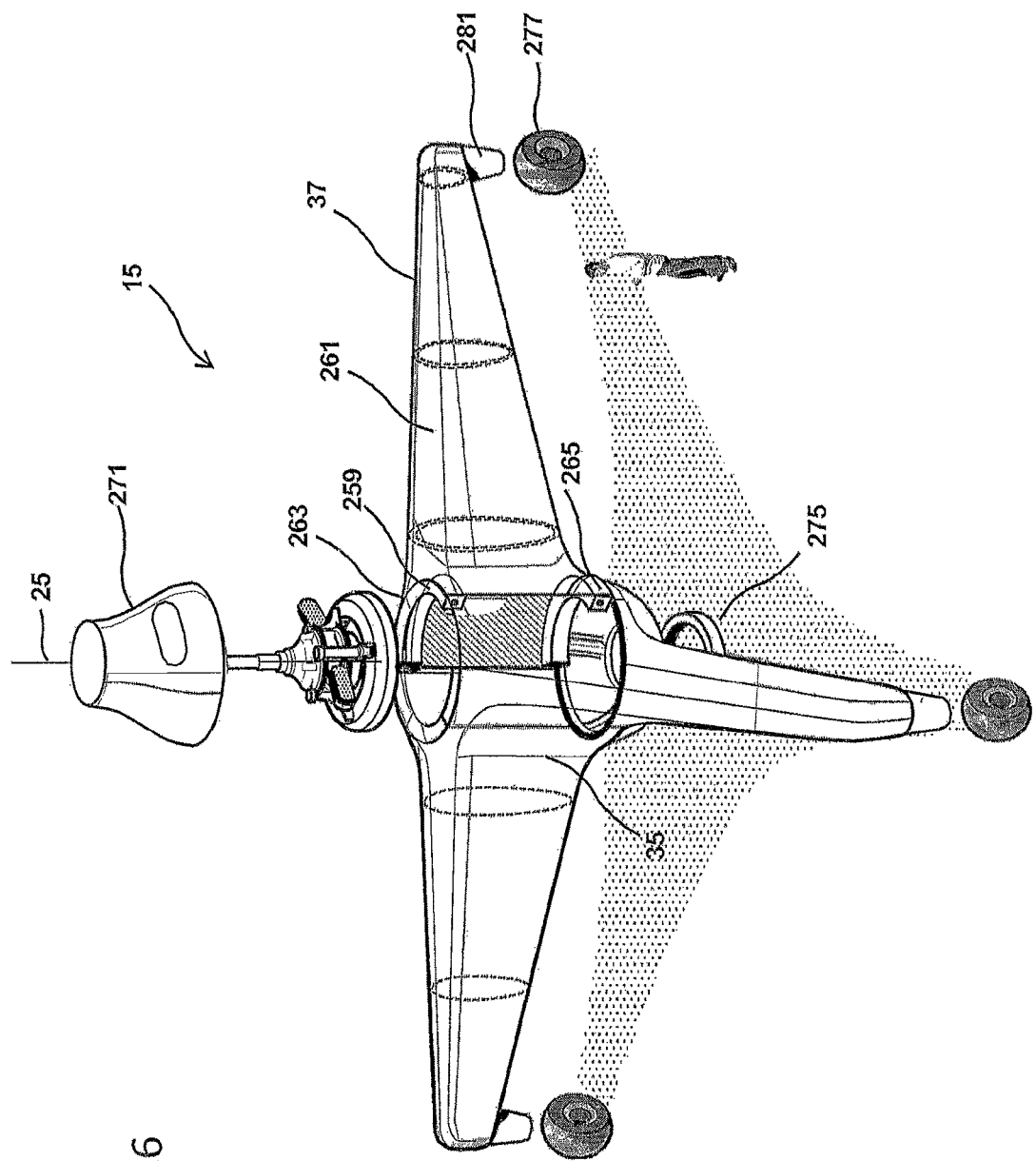
FIG. 26 is an exploded perspective view a support module of the rotorcraft of FIG. 1.
Figure 27:
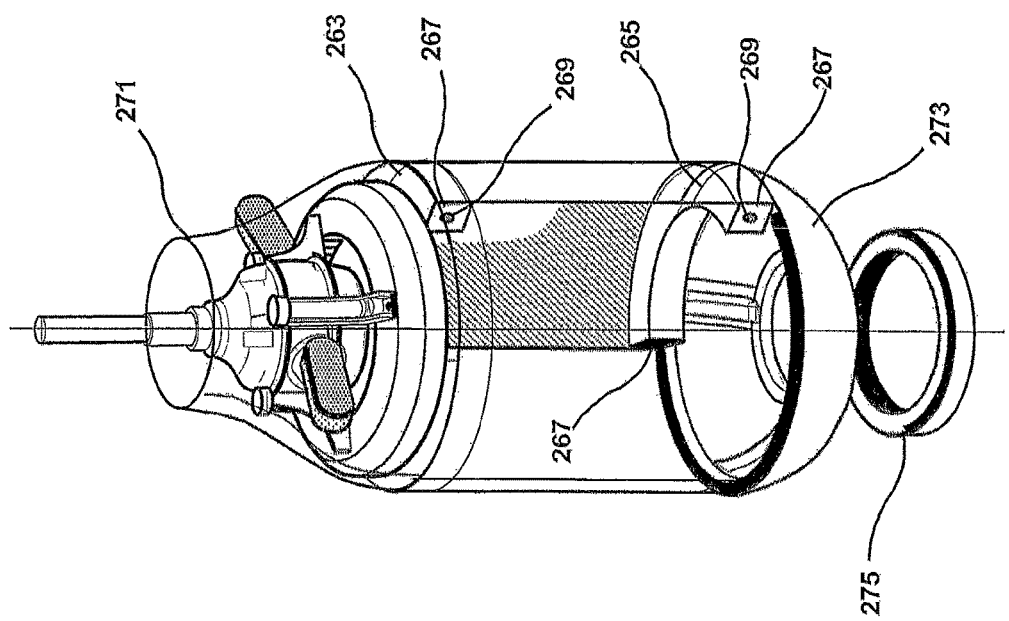
FIG. 27 is a partial cutaway perspective view of a portion of the support module of FIG. 26.

FIGS. 26 through 31 illustrate components, overall configuration, and construction of support module 15, with transmission 31 and platform 59 of lift module 13 also shown in FIGS. 26 and 27. In the preferred embodiment, each leg 37 comprises a central flange 259 and a support structure, such as beam 261, which extends generally horizontally from flange 259. Legs 37 are preferably constructed as a single piece formed entirely from graphite/epoxy composite layers bonded to a honeycomb core. Ideally, thick outer face sheets provide for damage protection and are stabilized by a thinner inner face sheet.

Each flange 259 comprises an integral upper ring section 263 and an integral lower ring section 265, each being arcuate. Upper ring sections 263 and lower ring sections 265 cooperate to form a central frame, with upper ring sections 263 of adjacent legs 37 attached to each other to form a circular central ring, and lower ring sections 265 attached in the same manner to form a lower central ring. In this way, flanges of legs 37 are attached together to form central body 37. To provide for attachment, each ring section 263, 265 has an attachment face 267 on each end of each ring section 263, 265. In the embodiment shown, each face 267 has a part 269 of a "bathtub"-type alignment fitting, in which a hole on one face 267 receives a lug protruding from the adjacent face 267. Bolts or other fasteners are used to retain adjacent faces 267 together to form upper and lower circular structural frames.

Centerbody 35 has a removable upper fairing 271 that covers transmission 31 and has provisions for gaining access to transmission 31 and blade actuation system 57. Centerbody 35 is capped on its underside by a rigid structural lower fairing 273, which is removable for access to the lower interior of centerbody 35. Fairings 271, 273 are preferably formed of lightweight, composite material and construction. Lower fairing 273 supports a lightweight, composite payload ring 275, which is designed as a guide for payload cable 43. At the outer end of each leg 37 is a landing gear assembly 277 for supporting support module 15 above a support surface. It should be noted that legs 37 may optionally include compartments for additional internal components, which may include, for example, auxiliary energy storage devices. Another expected use of storage in legs 37 may be for water tanks for firefighting applications.

Figure 28:
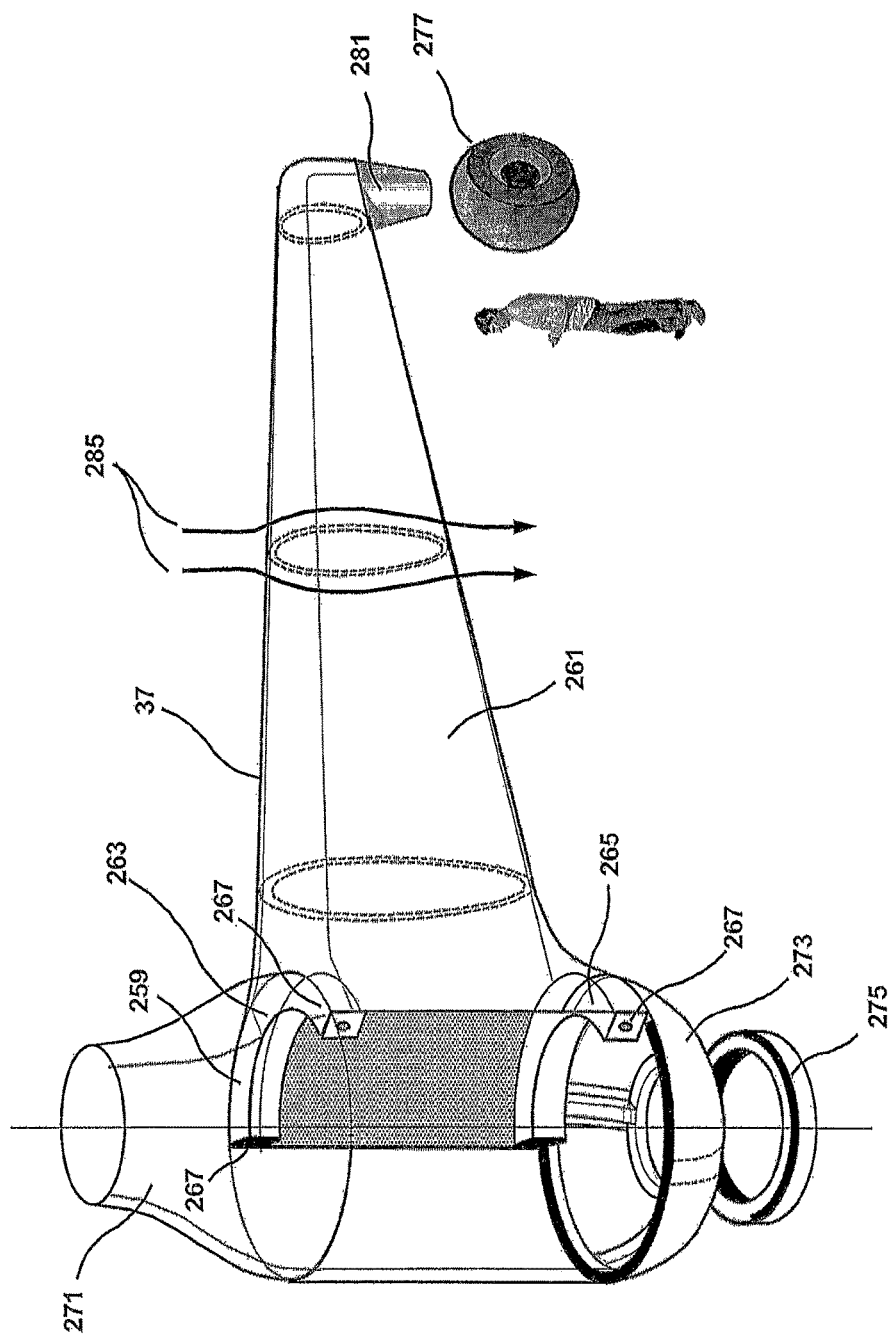
FIG. 28 is a partial cutaway perspective view of a portion of the support module of FIG. 26.
Figure 29B:
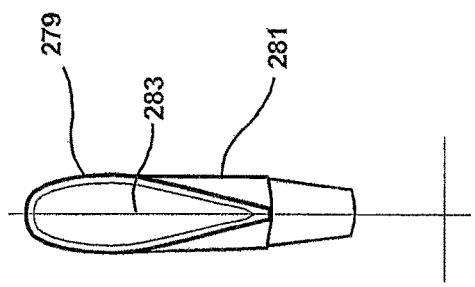
FIGS. 29A and 29B are cross-section views of a leg of the support module of FIG. 26.
Figure 29A:
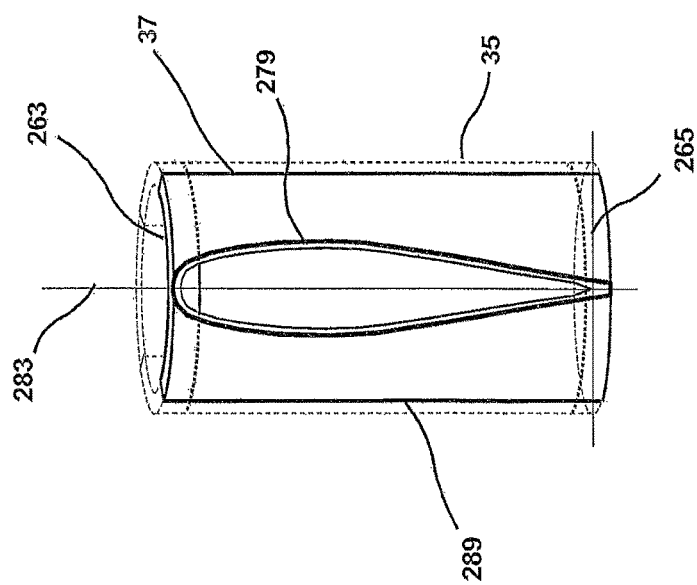

FIGS. 28 through 29B illustrate the minimal plan view shape of leg beam 261, which are contoured stream-wise to minimize drag interference on the vertically downward airflow from rotors 19, 21. An aerodynamic wing section 279 is formed as a hollow cross section which tapers down outboard toward pedestal 281 for landing gear 277. Wing section 279 has its chord axis 283 in the vertical plane, providing for a low-drag profile when exposed to the rotor down airflow, as shown as flow lines 285 in FIG. 28. As shown, wing section 279 is a symmetrical airfoil with no camber, but other airfoil configurations may be utilized. At centerbody 35, wing section 279 flares out into flange 259, including integral upper ring section 263 and lower ring section 265.

Figure 30:
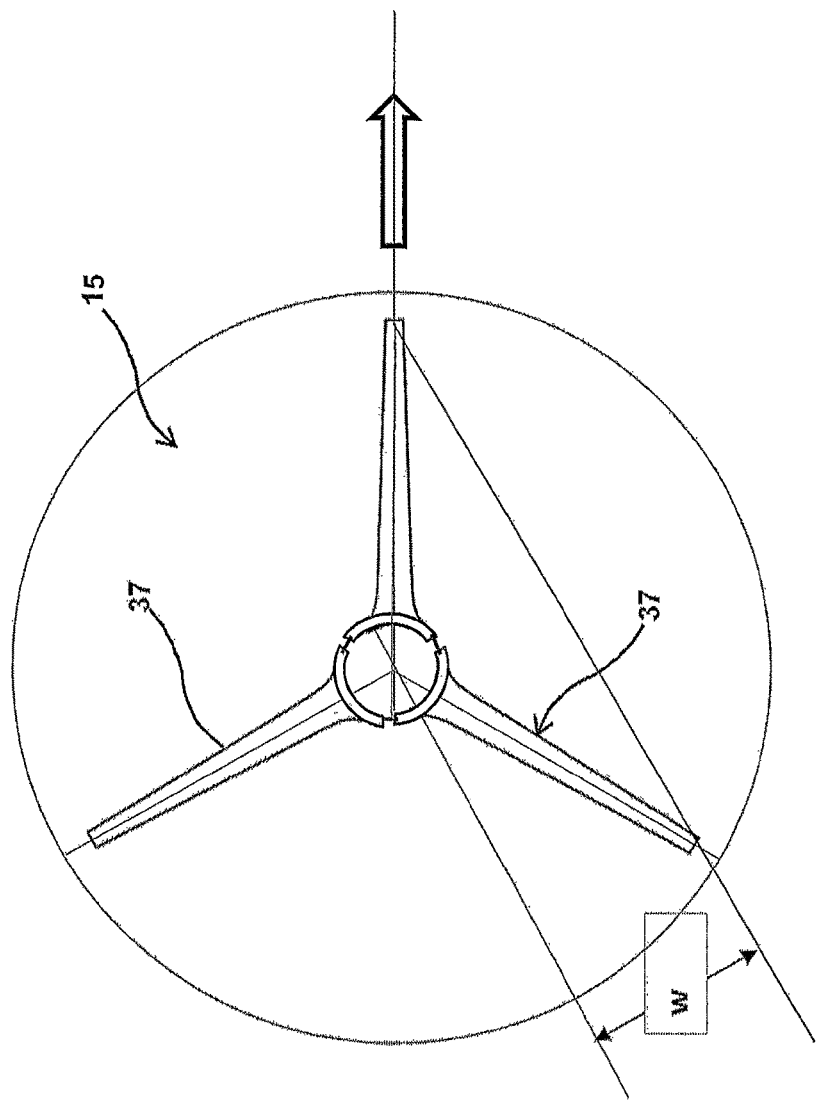
FIG. 30 is a plan view of the legs of the support module of FIG. 26.

FIG. 30 shows the preferred embodiment of support module 15, which is a composite structure comprising three identical legs 37, each presenting a slender, low-drag profile in the plan view with an ample ground turnover width W of 14 feet. Configurations of support module 15 having more legs can be used, but these have significant weight disadvantages, present problems with maintaining wheel contact on uneven terrain, and require longer field assembly times.

Figure 31:
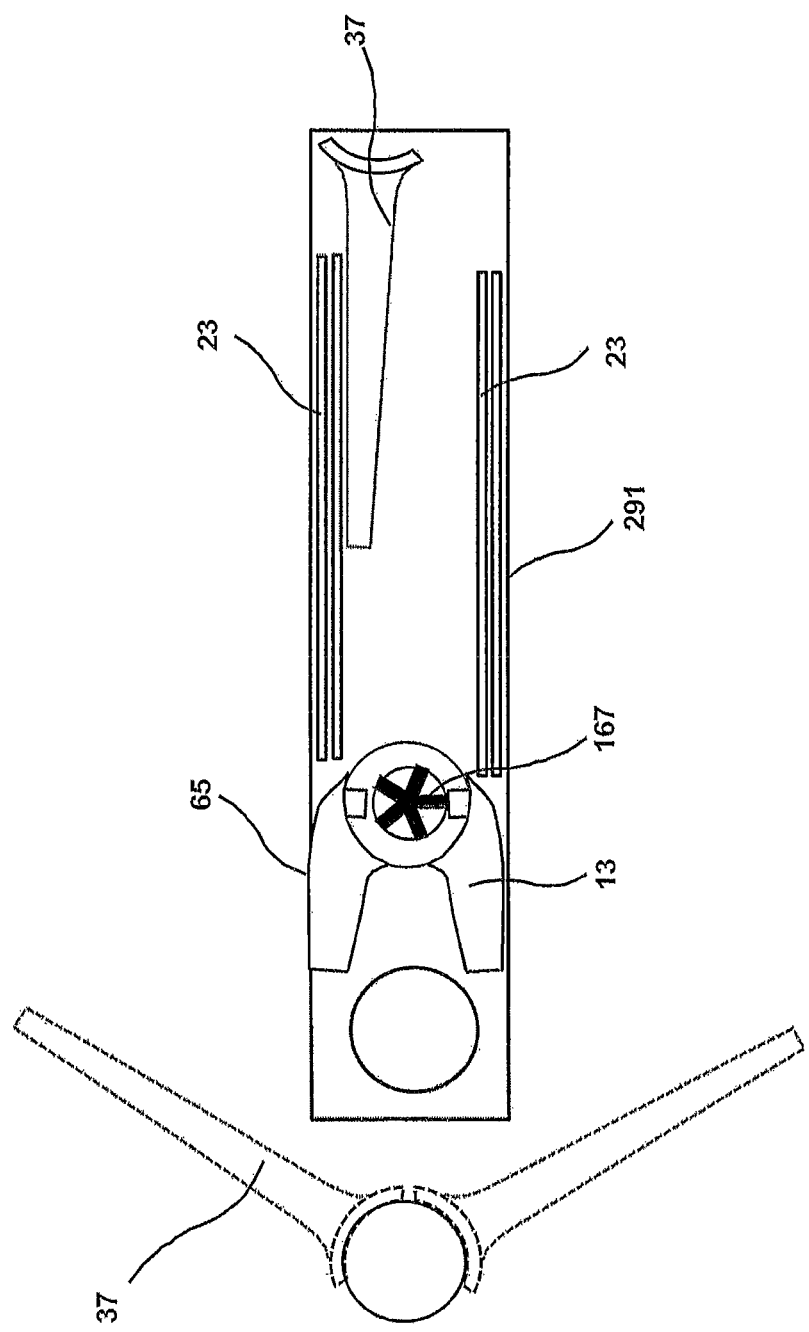
FIG. 31 is a plan view of a transport configuration of the rotorcraft of FIG. 1.

FIG. 31 shows a possible configuration for transport of a disassembled rotorcraft 11. One Leg 37 has been disassembled from the other legs 37, and blades 23 have been removed from rotor hubs 167. As shown, legs 37 and blades 23 are loaded together with the remainder of lift module 13 onto a transporter 291, which may be, for example, a typical flat bed of a semi-trailer, and transporter 291 may be equipped with devices to assist assembly and dis-assembly. In this manner, rotorcraft 11 may be moved to a location without the need to fly rotorcraft to the location or without the need for a specialized transport method.

Figure 32:
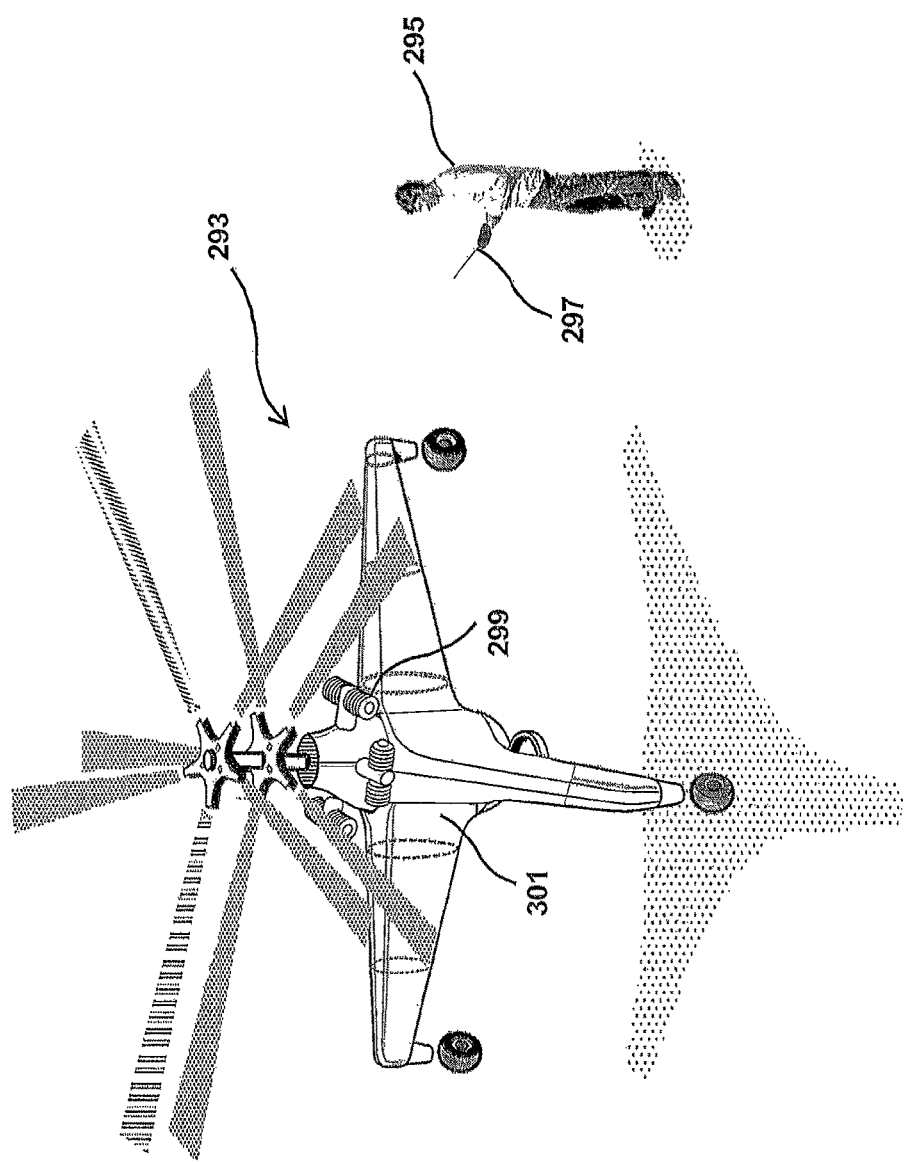
FIG. 32 is a perspective view of a radio-controlled flying scale model according to the present application.

FIG. 32 shows a radio-controlled flying scale model 293 of a heavy-lift rotorcraft, and an operator 295 operates model 293 with controller 297. This is an ideal means of pursuing development of a full-size vehicle, such as rotorcraft 11, and a handful of these inexpensive models would suffice in minimizing initial development costs and investment risks. Development may include a model 293, for example, of approximately $\frac{1}{6}^{th}$ scale. Model 293 could be powered by four small 35 hp engines 299 horizontally disposed about 301 centerbody in a radial manner, and driving directly into the transmission. As far as is possible, model 293 would incorporate most of the engineering aspects of the full-sized rotorcraft 11 and would be a valuable tool for developing the operational and remote control techniques that will be required and as trainers for operating personnel.

It has become evident from the basic minimal-weight design philosophy disclosed herein, that empty (without either fuel or payload), the disclosed design is capable of providing a maximum rotor thrust-to-weight ratio of at least about 3.5:1; and, with a 70% fuel load providing sufficient fuel for 70 minutes of flight, the disclosed design is capable of providing a maximum rotor thrust-to-weight ratio of at least about 2.8:1, whereas most current helicopter designs cannot exceed a ratio of greater than 1.8:1, and many have significantly lower ratios. These lower thrust-to-weight ratios stem from manned designs, which usually feature relatively large, high-drag fuselages rated for human occupancy, and power losses from anti-torque devices. None have the disclosed slender, "tripod" wing/fuselage configuration of support module 15. One unanticipated capability that has recently emerged from analyzing for this inherently high thrust-to-weight ratio in combination with lift from the aerodynamic "tripod wing" fuselage, is that it will is possible to power the vehicle through a curved flight path from vertical take-off or landing (VTOL) mode into horizontal cruising flight. As velocity increases along this flight path, a progressive tilting of the forward two legs 37 enables them to develop steadily greater normal lift with a vertical component until they provide the majority of the vertical support in horizontal, cruising flight. Small, endurance-limited battery operated RC helicopters can achieve similarly high thrust to weight ratios but do not feature the augmented lift from the airfoil configuration of legs 37.

Figure 33:
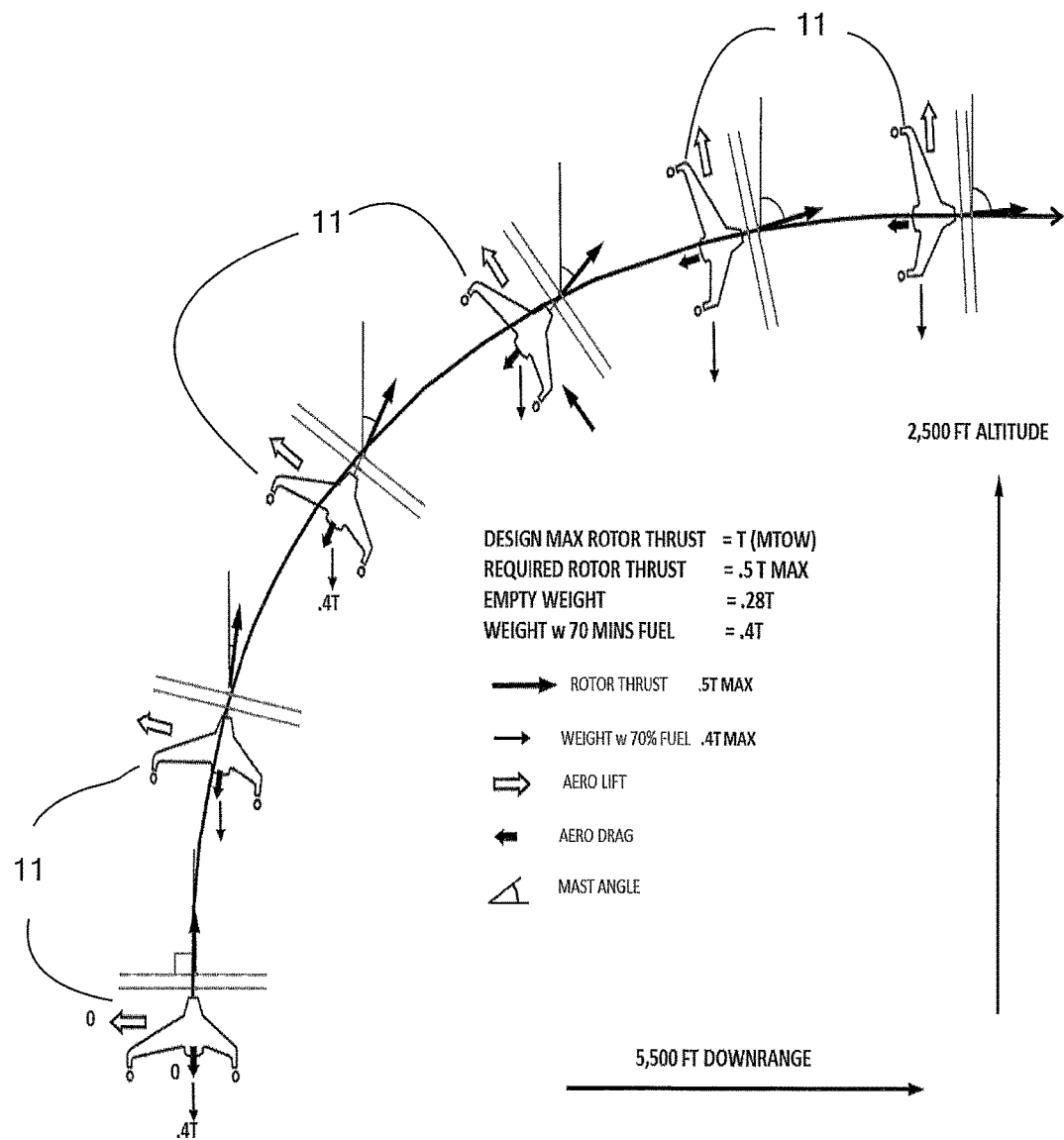
FIG. 33 is a schematic view depicting a rotorcraft according to the present application in transition to and in horizontal flight.
Figure 34:
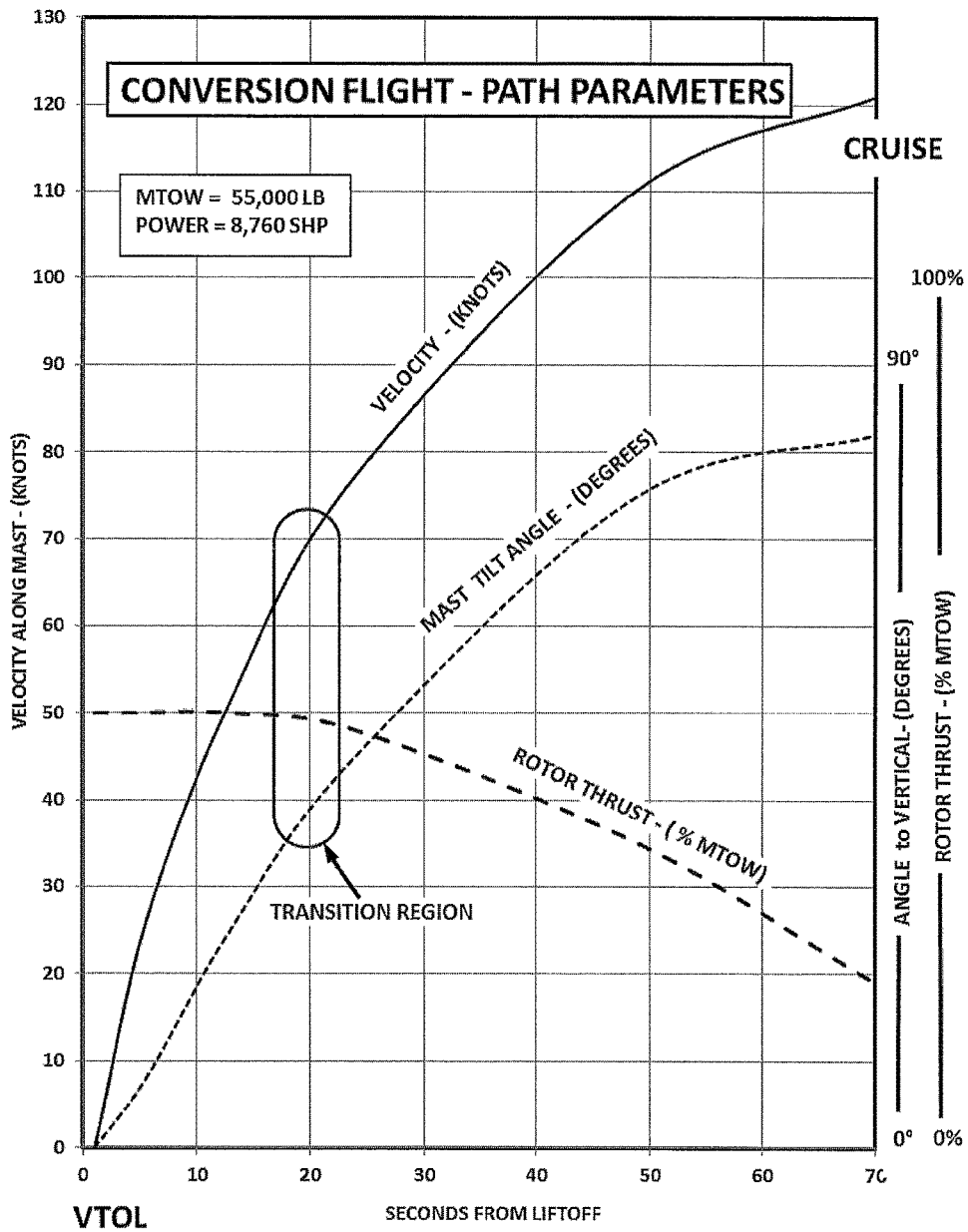
FIG. 34 is a graph of various dynamic characteristics of the rotorcraft in transition to horizontal flight as depicted in FIG. 33.
Figure 35C:
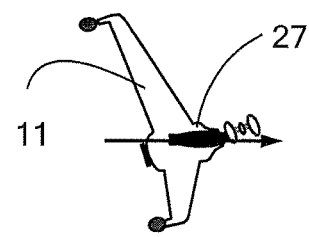
FIGS. 35A through 35D schematically illustrate rotation of the propulsion module according to the present application.
Figure 35B:
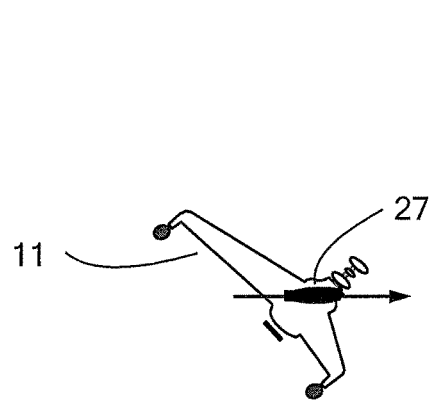
Figure 35D:
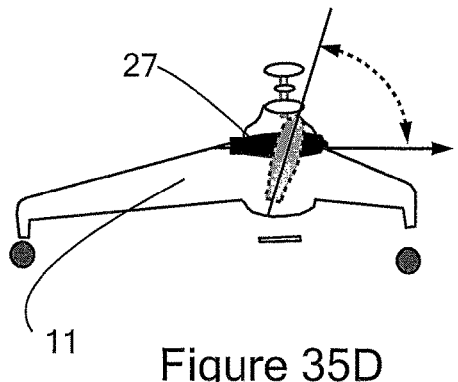
Figure 35A:
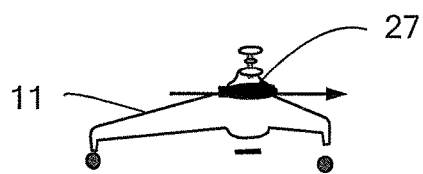

FIG. 33 illustrates the conversion flight path followed by rotorcraft 11 from the hover, as it takes off vertically, and accelerates upwards and forwards, so that it steadily translates through an arced trajectory into into fully horizontal cruising flight. Arrows indicate the aerodynamic lift, aerodynamic drag, and weight vectors during this flight. Because the vehicle weight with 70 minutes of fuel is unlikely to exceed 40% of maximum rotor thrust (T) the stated performance figures will likely be attained with less than 60% of the available engine power. Approximate values for mast angle, velocity along the mast, and required rotor thrust during this conversion maneuver are shown in the graph in FIG. 34. The transition point occurs at approximately 20 seconds into the flight, at 70 knots. At this point the rotor thrust is steadily decreased from 50% of maximum rotor thrust to 19% at approximately 70 seconds, when rotorcraft 11 is fully established in horizontal cruise. The maneuver will place rotorcraft 11 at approximately 5,550 feet downrange at an altitude of 2,500 feet.

When rotorcraft 11 transitions from the generally vertical orientation of VTOL flight into horizontal flight, it is preferable that propulsion module 27 (engines 29 and associated systems, described in detail above) remain in the same orientation. FIGS. 35A through 35D schematically illustrate rotation of the propulsion module 27 about the lateral axis of the bevel gear inputs (115, described in connection with FIGS. 8-12 and see below in connection with FIG. 36) into the transmission such that their longitudinal rotational axes maintain a horizontal orientation regardless of the tilt angle of the rotor mast and body of rotorcraft 11. This has the dual benefit of allowing the engines to maintain normal lubrication during operation, and also to maintain normal air breathing into the intake regardless of airstream angle as the aircraft tilts into horizontal cruising flight.

Figure 36:
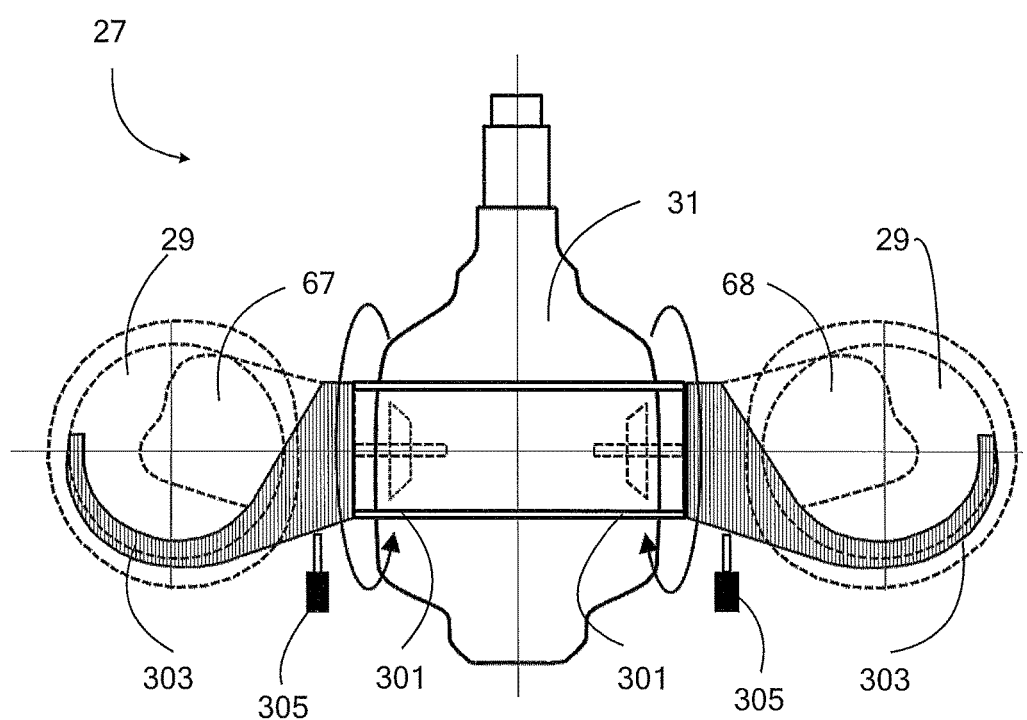
FIG. 36 illustrates the propulsion system rotation mechanism according to an embodiment of the present application.

FIG. 36 shows in detail how both engines 29 and their intermediate gearboxes 67, 68 are mounted on lightweight composite, aluminum, or magnesium cradles 301 which are coupled to large trunnions 303 on either side of transmission 31. Trunnions 303 receive the input drive shaft from the gearboxes 67, 68 which drive the internal pinions. Cradles 301 are rotated about the trunnions on the same axes as the pinions, so that motion of the engines is superimposed on the pinion rotations. These engine rotations require minimal load inputs provided by a pair of small actuators actuated 305 by gyros, which sense the horizontal orientation and rotate engines 29 accordingly.

It is apparent that an assembly with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A helicopter comprising:
   a lift module having a propulsion system comprising two coaxial, counter-rotating rotors and at least one engine, each rotor having a plurality of blades, each blade being of the same length, the rotors being driven in rotation about a mast axis by the engine, the rotors generating a total thrust along a thrust vector;
   a support module for supporting the helicopter when landed, the support module having at least three support members assembled in a radial array about the mast axis, in that the longitudinal axis of each support member intersects the mast axis;
   a payload support system adapted to couple an external payload directly to the lift module;
   wherein loads on the support module and associated component weights are significantly reduced, such that a ratio of the total thrust of the rotor to an empty weight of the helicopter is greater than about 3.5 to 1.

2. The helicopter of claim 1, wherein a ratio of the total thrust of the rotor to a weight of the helicopter carrying 70 minutes of fuel, but no payload, is greater than about 2.7 to 1.

3. The helicopter of claim 1, comprising a collective control system coupled to the rotor for varying a magnitude of the thrust vector, and a cyclic control system coupled to the rotor for varying an angle of the thrust vector in a forward direction such that when operated selectively in combination, the thrust vector of the rotors accelerates the helicopter along the initial vertical mast orientation and progressively tilts the helicopter, so that the thrust vector follows along an arced flight path until the helicopter reaches a horizontal cruise orientation.

4. The helicopter of claim 3, wherein the acceleration of the helicopter along the arced flight path causes the helicopter to increase both its vertical and horizontal velocity, thereby progressively tilting the mast from the vertical, so that it follows the arced flight path, until the helicopter reaches the horizontal cruise orientation.

5. A helicopter, comprising:
   a lift module having a propulsion system and at least one rotor driven in rotation about a mast axis by the propulsion system, the rotor generating thrust along a thrust vector; and
   a support module for supporting the helicopter when landed, the support module having at least three support members, each support member being of the same size and shape, extending outwardly in a radial array about the mast axis, each support member having an airfoil-shaped cross-section with its chord parallel to the mast axis, wherein during flight, increased velocity of the helicopter along an inclined and arced flight path permits the support members to develop a normal lifting force, further increasing inclination of the helicopter, and a vertical component of the lifting force in combination with a vertical component of the thrust provides sufficient lift to sustain the helicopter in horizontal flight, such that the mast axis is oriented in a substantially horizontal direction; wherein a ratio of the total thrust of the rotor to an empty weight of the helicopter is greater than about 3.5 to 1.

6. The helicopter of claim 5, wherein the propulsion system comprises an at least one engine or propulsion means the primary axis of which is adapted to remain parallel to the plane of the arced flight path while maintaining a horizontal orientation regardless of the inclination of the rotor mast.

7. The helicopter of claim 5, wherein a ratio of the total thrust of the rotor to a weight of the helicopter carrying 70 minutes of fuel, but no payload, is greater than 27 to 1.

8. The helicopter of claim 5, comprising a collective control system coupled to the rotor for varying a magnitude of the thrust vector, and a cyclic control system coupled to the rotor for varying an angle of the thrust vector in a forward direction such that when operated selectively in combination, the thrust vector of the rotors accelerates the helicopter along the initial vertical mast orientation and progressively tilts the helicopter, so that the thrust vector follows along an arced flight path until the helicopter reaches a horizontal cruise orientation.

9. The helicopter of claim 5, wherein the acceleration of the helicopter along the arced flight path causes the helicopter to increase both its vertical and horizontal velocity, thereby progressively tilting the mast from the vertical so that the helicopter follows the arced flight path, until the helicopter reaches a horizontal cruise orientation.

10. A helicopter, comprising:
    a lift module having a propulsion system and at least one rotor driven in rotation about a mast axis by the propulsion system the rotor generating thrust along a thrust vector; and
    a support module for supporting the helicopter when landed, the support module having at least three support members extending outwardly in a radial array about the mast axis, each support member having an airfoil-shaped cross-section with its chord parallel to the mast axis, wherein during flight, increased velocity of the helicopter along an inclined and arced flight path permits the support members to develop a normal lifting force, further increasing inclination of the helicopter, and a vertical component of the lifting force in combination with a vertical component of the thrust provides sufficient lift to sustain the helicopter in horizontal flight, such that the mast axis is oriented in a substantially horizontal direction;
    counter-rotating rotors;
    a transmission for transferring torque to the rotors through a differential with two ring gears, each ring gear coupled to an output shaft coupled to one of the rotors; and
    a yaw control system comprising:
       a balance shaft rotatably carried by the transmission, the balance shaft coupling the ring gears for balancing torque between the ring gears; and
       a rotary actuator coupled to the balance shaft for selectively rotating the balance shaft relative to a housing of the transmission, wherein rotation of the balance shaft causes rotation of the housing about the differential, thereby causing yaw rotation of the helicopter generally about the mast axis.

11. The helicopter of claim 10, wherein the balance shaft couples the output shafts by engaging the ring gear associated with each output shaft, so that there is no rotation of each ring gear relative to the other ring gear.

12. The helicopter of claim 10, wherein the balance shaft comprises:
    pinions that each engage the ring gear of each output shaft.

* * * * *